US012079925B2

(12) United States Patent
Wu et al.

(10) Patent No.: US 12,079,925 B2
(45) Date of Patent: *Sep. 3, 2024

(54) OCCLUDER GENERATION FOR STRUCTURES IN DIGITAL APPLICATIONS

(71) Applicant: TENCENT AMERICA LLC, Palo Alto, CA (US)

(72) Inventors: Kui Wu, Palo Alto, CA (US); Xifeng Gao, Palo Alto, CA (US); Zherong Pan, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/126,047

(22) Filed: Mar. 24, 2023

(65) Prior Publication Data

US 2023/0237733 A1   Jul. 27, 2023

Related U.S. Application Data

(63) Continuation of application No. 17/866,413, filed on Jul. 15, 2022, now Pat. No. 11,663,772.

(60) Provisional application No. 63/302,916, filed on Jan. 25, 2022.

(51) Int. Cl.
  *G06T 15/40* (2011.01)
  *G06T 17/20* (2006.01)

(52) U.S. Cl.
  CPC ............ *G06T 15/40* (2013.01); *G06T 17/205* (2013.01)

(58) Field of Classification Search
  CPC ........ G06T 15/40; G06T 17/20; G06T 17/205
  See application file for complete search history.

(56) References Cited

U.S. PATENT DOCUMENTS

| 8,718,328 | B1 | 5/2014 | Gaddy et al. |
| 11,663,772 | B1 | 5/2023 | Wu et al. |
| 2002/0005850 | A1* | 1/2002 | Osborne ................. G06T 15/08 345/424 |

(Continued)

OTHER PUBLICATIONS

Silvennoinen, Ari, et al. "Occluder simplification using planar sections." Computer Graphics Forum. vol. 33. No. 1. 2014. (Year: 2014).*

(Continued)

*Primary Examiner* — Daniel F Hajnik
(74) *Attorney, Agent, or Firm* — Morgan, Lewis & Bockius LLP

(57) ABSTRACT

A method is performed at a computing system for automatically generating an occluder, the method includes receiving an input model of the visual three-dimensional structure, the input model having a plurality of faces. The method includes simplifying the input model into an initial occluder including a plurality of candidate patches in a patch-based coarse mesh. The method includes determining a first quality metric of the initial occluder measured by a first number of pixels corresponding to objects behind the visual three-dimensional structure that are blocked by the input model and the initial occluder along a first view direction. The method includes removing one or more candidate patches associated with the first number of pixels from the initial occluder while maintaining the first quality metric above a first threshold to form the occluder for the visual three-dimensional structure.

20 Claims, 16 Drawing Sheets

(56) References Cited

U.S. PATENT DOCUMENTS

| | | | |
|---|---|---|---|
| 2003/0214501 A1 | 11/2003 | Hultgren et al. | |
| 2006/0103645 A1 | 5/2006 | Jacobson | |
| 2010/0315419 A1* | 12/2010 | Baker | G06T 17/10 345/420 |
| 2011/0175912 A1 | 7/2011 | Beeler et al. | |
| 2014/0118621 A1 | 5/2014 | Liu et al. | |
| 2016/0110917 A1 | 4/2016 | Iverson et al. | |
| 2016/0171745 A1 | 6/2016 | Silvennonen et al. | |
| 2021/0366191 A1* | 11/2021 | Brimhall | G06T 15/04 |

OTHER PUBLICATIONS

Carlos Andujar et al., "LOD Visibility Culling and Occluder Synthesis." Computer-Aided Design 32, Feb. 3, 2000, 11 pgs.

David Cohen-Steiner et al., "Variational Shape Approximation", ACM Transactions on Graphics, Aug. 2004, 11 pgs., Retrieved from the Internet: https://www.researchgate.net/publication/29611860_Variational_Shape_Approximation.

Kui Wu et al., "[PG2022] Occluder Generation for Buildings in Digital Games", YouTube, Sep. 13, 2022, 42 pgs., Retrieved from the Internet: https://www.youtube.com/watch?v=XIU7S0p7_8Q.

Kui Wu et al., "Occluder Generation for Buildings in Digital Games", Pacific Graphics 2022, vol. 41, No. 7, Oct. 8, 2022, 11 pgs., Retrieved from the Internet: https://diglib.eg.org/bitstream/handle/10.1111/cgf14669/v41i7pp205-214.pdf?sequence=1&isAllowed=y.

Fei-Ah Law et al., "Preprocessing Occlusion for Real-Time Selective Refinement", Proceedings of the 1999 Symposium on Interactive 3D Graphics, 1999, 8 pgs.

Michael Garland et al., "Surface Simplification Using Quadric Error Metrics", Carnegie Mellon University, Association for Computing Machinery, Inc., 8 pgs., 1997.

Simplygon 9 Documentation, "This example shows how to use the Reduction pipeline with a visibility occlude", Microsoft, 1 pg., no date provided.

Tencent Technology, ISRWO, PCT/US2022/040301, Dec. 15, 2022, 6 pgs.

Unity Documentation, "Occlusion Culling", Unity User Manual, Version 2020.3, Dec. 23, 2021, 1 pg.

\* cited by examiner

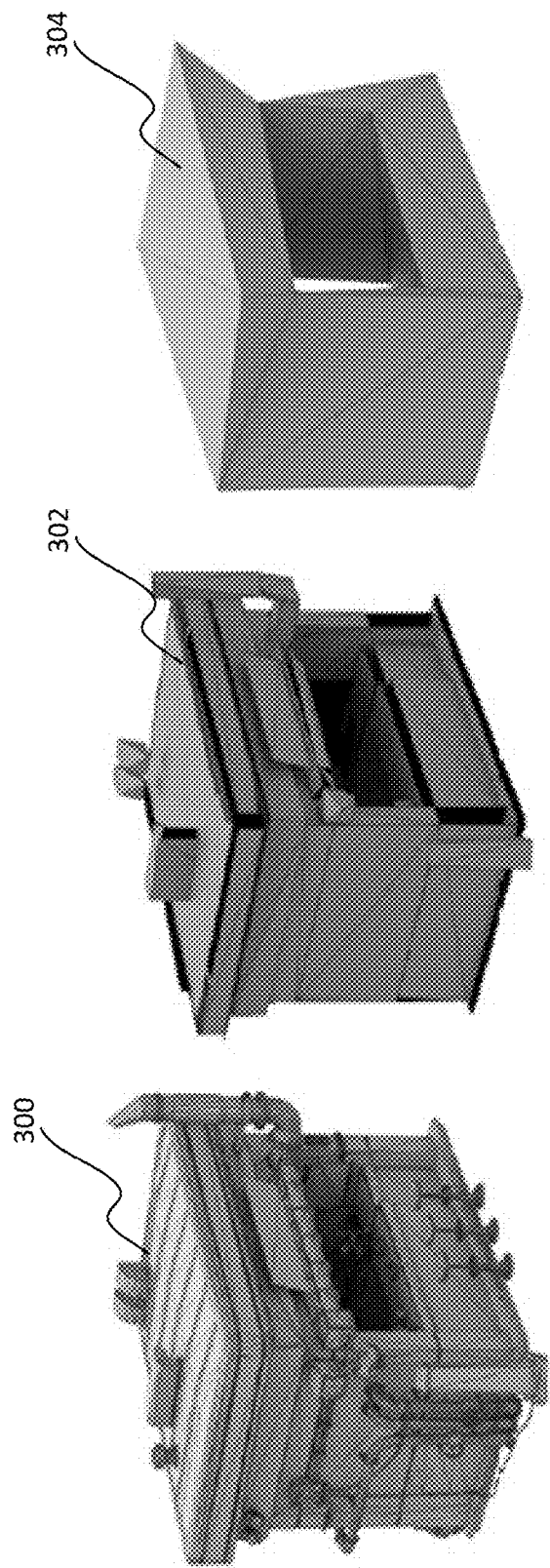
Figure 3C
Figure 3B
Figure 3A
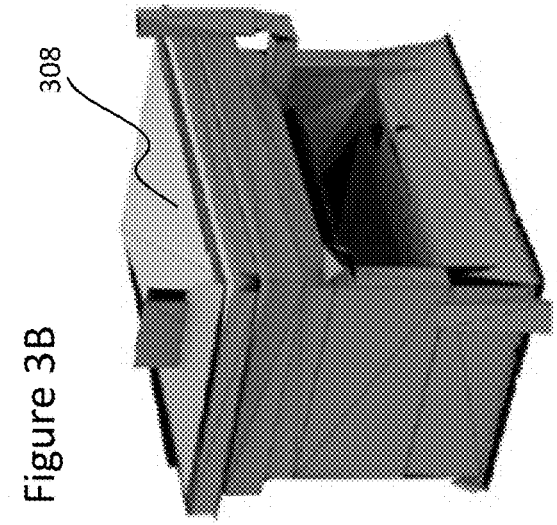
Figure 3E
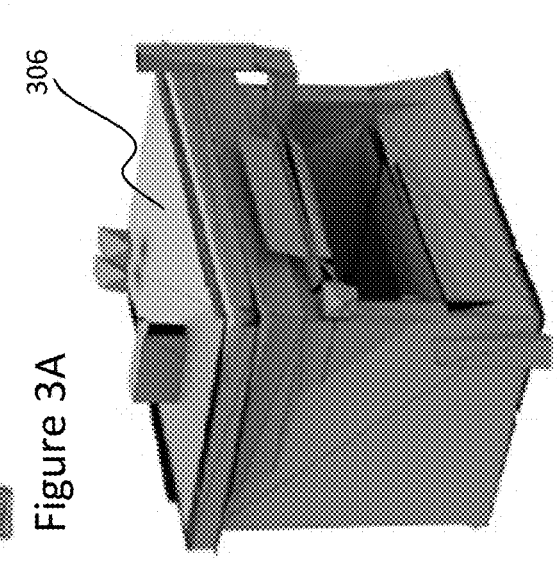
Figure 3D

Figure 12

OCCLUDER GENERATION FOR STRUCTURES IN DIGITAL APPLICATIONS

PRIORITY CLAIM AND RELATED APPLICATIONS

This application is a continuation of U.S. patent application Ser. No. 17/866,413, entitled "OCCLUDER GENERATION FOR STRUCTURES IN DIGITAL APPLICATIONS" filed on Jul. 15, 2022, which claims priority to U.S. Provisional Application No. 63/302,916, entitled "Occluder Generation for Building In Digital Games," filed on Jan. 25, 2022, the content of which is incorporated herein by reference in their entirety.

TECHNICAL FIELD

The disclosed implementations relate generally to the field of computer technologies, and in particular, to occlusion culling in computer graphics.

BACKGROUND

Occlusion culling techniques are used in modern game engines to remove hidden objects from the rendering pipeline. Objects are hidden, with respective to a particular viewing direction, when another object is present in front of those objects, along the particular viewing direction.

SUMMARY

By using an approximated coarse mesh (occluder) rather than a fine rendering mesh (visual mesh) during runtime of an application to cull hidden objects, graphical processing unit (GPU) bandwidth is saved, and rendering costs are reduced because of reduced in the number of draw calls. A draw call instructs a GPU to prepare drawing resources based on information about textures, states, shaders, rendering objects, buffers, etc.

The quality of the occluder mesh impacts the efficacy and accuracy of culling. A low-poly mesh (e.g., a polygon mesh that has a relatively small number of polygons) reduces the cost of the culling test. The culling test checks if a particular face is completely occluded by other faces. If so, the particular face is discarded from the rendering pipeline to save the cost for further rendering steps. In some embodiments, low-poly mesh may include about 200-300 polygons. In addition, the occluder should ideally be conservative, and be completely within the volume of the visual mesh. Thus, non-conservative occluders can cull visible objects (e.g., objects outside the volume of the visual mesh) by mistake, causing severe visual artifacts, as explained in context of FIGS. 1B and 1C below.

Some objectives of the present application are to address the challenges raised above by presenting a set of solutions to automate the generation of occluders for three-dimensional structures.

According to one aspect of the application, a method is performed at a computing system for automatically generating an occluder for a visual three-dimensional structure. The method includes the following steps: receiving an input model of the visual three-dimensional structure, the input model including a plurality of faces; generating an initial occluder by simplifying the input model into a plurality of candidate patches in a patch-based coarse mesh, the initial occluder blocks objects behind the visual three-dimensional structure along a first view direction; comparing a first two-dimensional area occluded by the input model of the visual three-dimensional structure and a second two-dimensional area occluded by the initial occluder along the first view direction to determine a first quality metric based on a first number of pixels that are blocked by the input model that is also blocked by the initial occluder; removing a plurality of faces from the initial occluder while maintaining the first quality metric above a first threshold to form the occluder for the visual three-dimensional structure. The occluder blocks the objects behind the visual three-dimensional structure from being rendered in the application along the first view direction.

According to another aspect of the present application, a computing system for automatically generating an occluder for a visual three-dimensional structure. The computing system includes one or more processors; memory; and a plurality of programs stored in the memory. The plurality of programs, when executed by the one or more processors, cause the computing system to perform one or more operations including: receiving an input model of the visual three-dimensional structure, the input model including a plurality of faces; generating an initial occluder by simplifying the input model into a plurality of candidate patches in a patch-based coarse mesh, the initial occluder blocks objects behind the visual three-dimensional structure along a first view direction; comparing a first two-dimensional area occluded by the input model of the visual three-dimensional structure and a second two-dimensional area occluded by the initial occluder along the first view direction to determine a first quality metric based on a first number of pixels that are blocked by the input model that is also blocked by the initial occluder; removing a plurality of faces from the initial occluder while maintaining the first quality metric above a first threshold to form the occluder for the visual three-dimensional structure. The occluder blocks the objects behind the visual three-dimensional structure from being rendered in the application along the first view direction According to yet another aspect of the present application, a non-transitory computer readable storage medium, in connection with a computing system having one or more processors, stores a plurality of programs for automatically generating an occluder for a visual three-dimensional structure. The plurality of programs, when executed by the one or more processors, cause the computing system to perform one or more operations including: receiving an input model of the visual three-dimensional structure, the input model including a plurality of faces; generating an initial occluder by simplifying the input model into a plurality of candidate patches in a patch-based coarse mesh, the initial occluder blocks objects behind the visual three-dimensional structure along a first view direction; comparing a first two-dimensional area occluded by the input model of the visual three-dimensional structure and a second two-dimensional area occluded by the initial occluder along the first view direction to determine a first quality metric based on a first number of pixels that are blocked by the input model that is also blocked by the initial occluder; removing a plurality of faces from the initial occluder while maintaining the first quality metric above a first threshold to form the occluder for the visual three-dimensional structure. The occluder blocks the objects behind the visual three-dimensional structure from being rendered in the application along the first view direction.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

FIGS. 3A-3E show an input model, results of patch-based simplification of the input model, results of voxelization-based simplification of the input model, combination of the results, and a final occluder after metric-guided mesh simplification according to some implementations of the present application;

FIG. 12 shows example buildings and corresponding occluders generated according to some implementations of the present application;

DETAILED DESCRIPTION

Figure 1A:
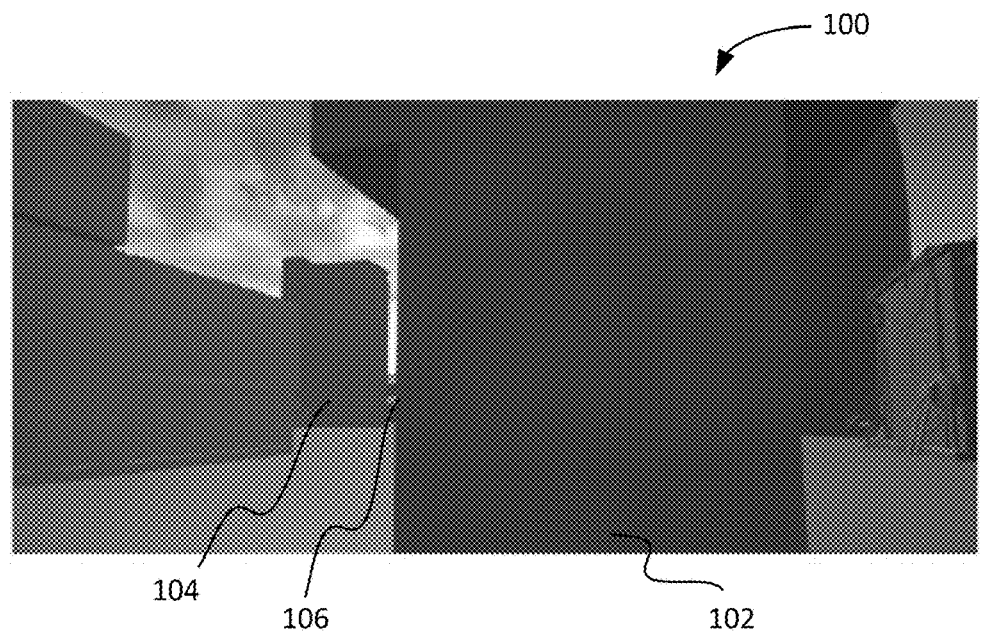
FIGS. 1A-1D depict how non-conservative occluders can cull visible objects according to some implementations of the present application.

The description of the following implementations refers to the accompanying drawings, so as to illustrate specific implementations that may be implemented by the present application. Direction terminologies mentioned in the present application, such as "upper", "lower", "front", "rear", "left", "right", "inner", "outer', "side" are only used as reference of the direction of the accompany drawings. Therefore, the used direction terminology is only used to explain and understand the present application, rather than to limit the present application. In the figure, units with similar structures are represented in same reference numerals.

FIG. 1A shows an actual view 100 from a location in front of a structure 102. The actual view 100 corresponds to the ground truth of what a player at the location would observe. A first structure 104 and a second structure 106 are visible from the location in front of the structure 102 along this viewing direction in the actual view 100.

Figure 1B:
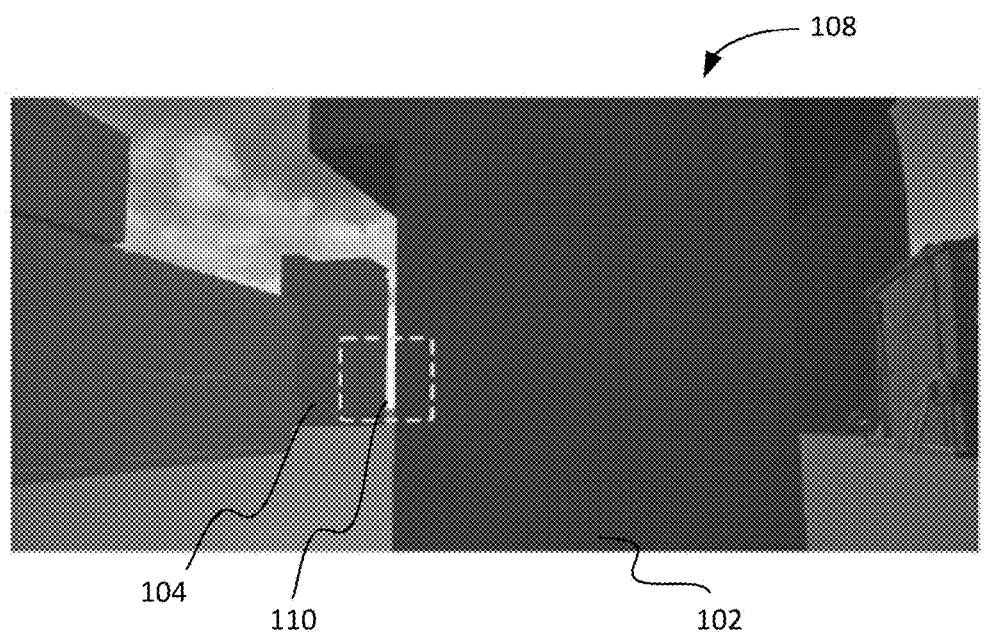

FIG. 1B shows a view 108 from the same location in front of the structure 102 when a first non-conservative occluder is used. An example of the first non-conservative occluder includes occluders generated by Silvennoinen. The second structure 106 visible from the location in front of the structure 102 along this viewing direction in the actual view 100 is no longer visible in the view 108 because the first non-conservative occlude extends beyond the volume of the visual mesh, culling the second structure 106 which should have been visible, as shown in the actual view 100. Instead, a region 110 devoid of the second structure 106 is shown in the view 108.

Figure 1C:
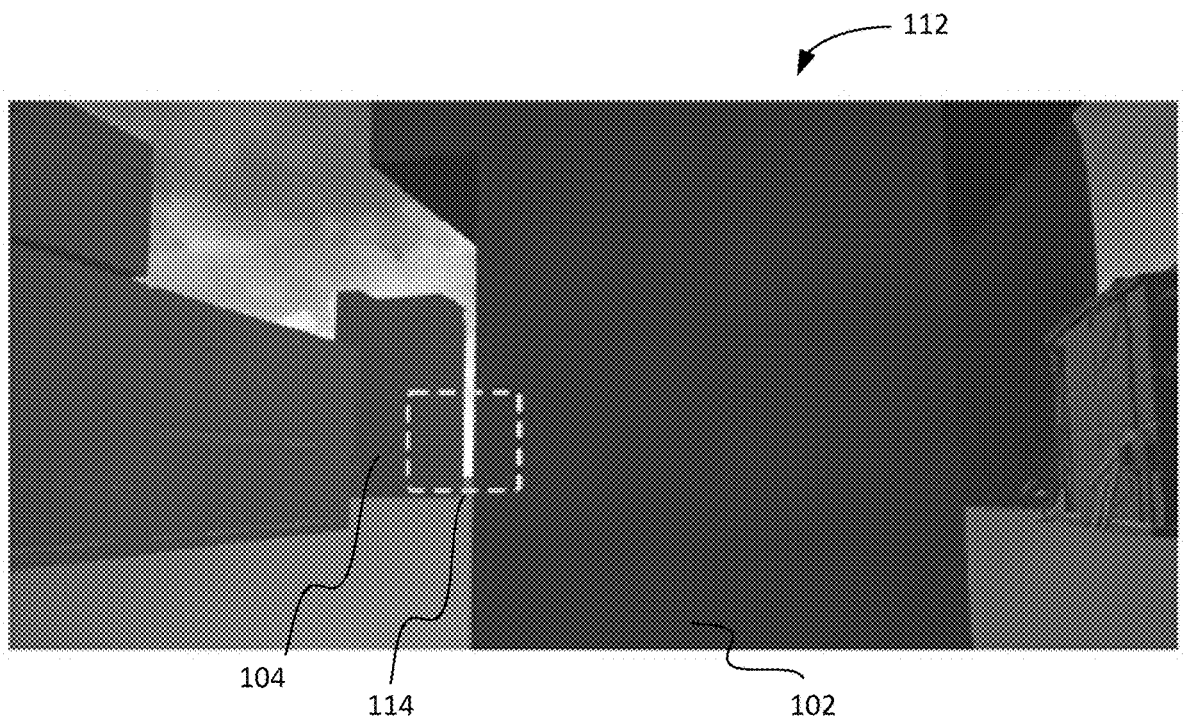

FIG. 1C shows a view 112 from the same location in front of the structure 102 when a second non-conservative occluder is used. An example of the second non-conservative occluder includes occluders generated by Simplygon. The second structure 106 visible from the location in front of the structure 102 along this viewing direction in the actual view 100 is no longer visible in the view 112 because the second non-conservative occluder extends beyond the volume of the visual mesh, culling the second structure 106 which should have been visible, as shown in the actual view 100. Instead, a region 114 devoid of the second structure 106 is shown in the view 112.

Figure 1D:
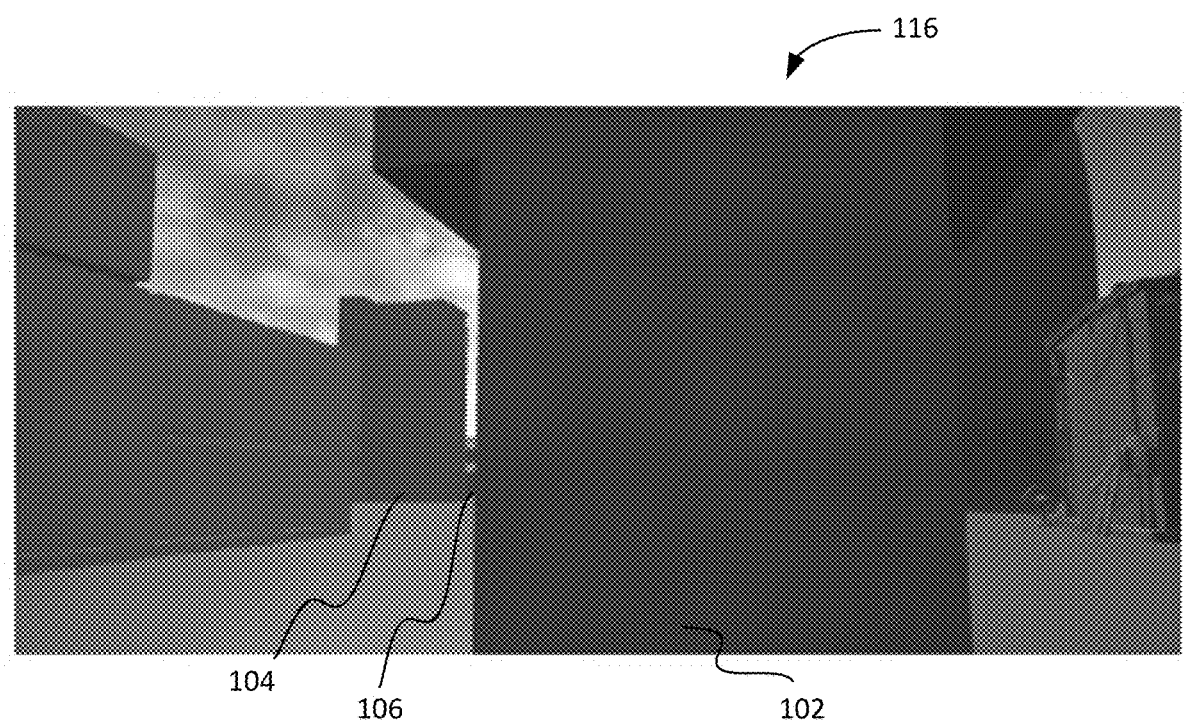

FIG. 1D shows a view 116 from the same location in front of the structure 102 when an occluder in accordance with some embodiments of the present invention is used. The second structure 106 visible from the location in front of the structure 102 along this viewing direction in the actual view 100 is once again visible in the view 116.

Figures 2A, 2B:
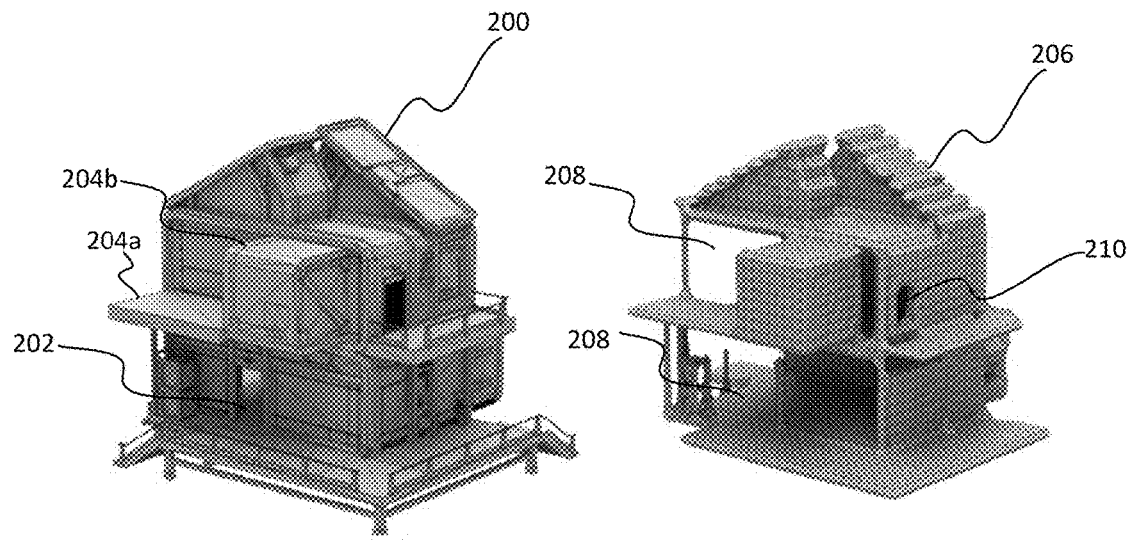
FIGS. 2B-2E show different meshes derived from is an input model shown in FIG. 2A according to some implementations of the present application.

Non-conservative occluders can cull visible objects by mistake, causing severe visual artifacts, as shown in FIGS. 1B and 1C. As disclosed in greater details below, two metrics, precision and recall, are used in accordance with some embodiments to qualitatively measure the accuracy of an occluder over a 3D domain. Precision measures the possibility of an object blocked by the occluder being also blocked by the original model. Recall computes the possibility of an object blocked by the original model being also blocked by the occluder. The embodiments disclosed herein relate to automatically generating occluders for structures (e.g., building models) from game assets. Game artists manually craft building models to maximize their visual realism, which typically contains numerous disconnected pieces, large open doors and windows, and interior structures, as demonstrated in FIG. 2A. FIG. 2A shows an input model 200 having an open door 202, and disconnected pieces 204a and 204b. In some embodiments, the model 200 may be an input mesh having 7888 faces, 521 components, 562 boundary loops, and 9034 intersected triangle pairs. In some embodiments, each boundary loop is a hole. As artists only focus on the buildings' appearance, building models are typically non-manifold, non-watertight, and self-intersecting, rendering conventional meshing processing algorithms inaccessible. In some embodiments, non-manifold geometry includes any edge shared by more than two faces. In some embodiments, at least one edge in a non-watertight model is boundary edge. In other words, a non-watertight mesh has a hole. In some embodiments, a model that is self-intersecting means the mesh has two faces which intersect with each other.

Handcrafted building occluders may be manually tuned to achieve a satisfactory balance between precision and recall, but such a process may use up hours of labor. Furthermore, handmade occluders may still include faces that do not contribute to the recall or violate the conservative constraint. Such faces may be termed "wasted faces."

One strategy for automatic occluder generation strategy is to first voxel the input mesh, extracting an isosurface (e.g., "an output isosurface") from the voxelized input mesh, and then simplifying the output isosurface, inserting axis-aligned boxes, or cross-sectional faces to form the occluder. In some embodiments, an axis-aligned box (AAB) is simply a rectangular parallelepiped whose faces are each perpendicular to one of the basis vectors. Using such a strategy may cause some essential features, e.g., thin walls, to not be captured at an affordable resolution, as shown in FIG. 2B. FIG. 2B shows an isosurface 206 corresponding to a winding number of 0.5. Thin walls 208 are missing in the isosurface 206, when compared to the input model 200. Moreover, nested and open structures in building models can cause ill-defined orientations, for which the isosurface may not be extracted accurately and correctly. For example, an edge (or face) within an open structure may have a front direction that is perpendicular to one edge of the open structure and parallel to another edge of the open structure, making the orientation of the open structure ill-defined. For example, two connected faces may have reversed normal directions.

Figures 2C, 2D, 2E:
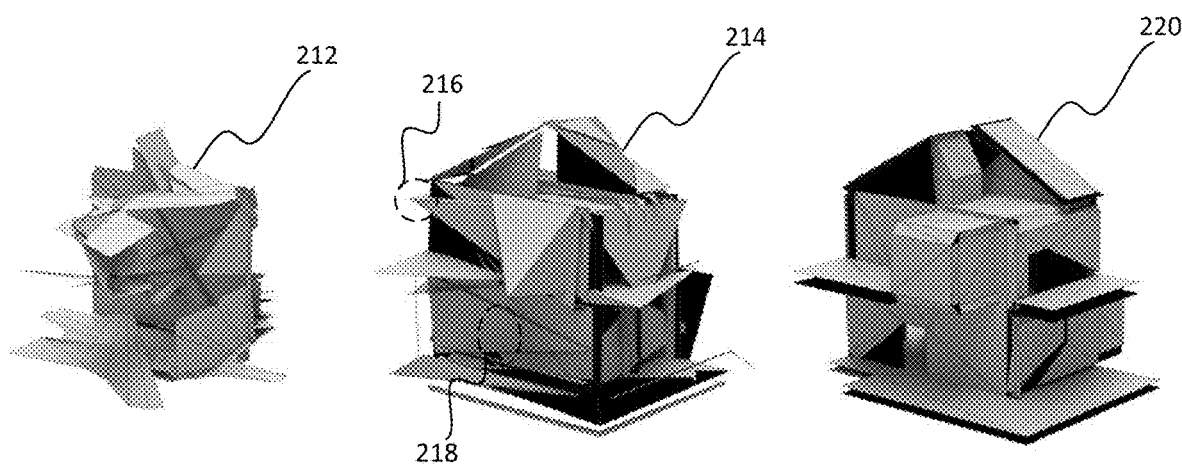

FIG. 2C shows a resulting mesh 212 obtained using by applying the method of Silvennoinen on the isosurface 206. The resulting mesh 212 is obtained by inserting cutting planes. In some embodiments, the resulting mesh 212 may include 150 faces.

The second strategy involves progressively removing faces from the input mesh through error-guided element-removal operations. The second strategy, in some embodiments, includes operations such as edge collapse, which may generate results having large gaps and parts outside the visual mesh. Such a resulting mesh violates conservativity, such as the example shown in FIG. 2D. FIG. 2D shows an occluder 214 generated by Simplygon. A portion 216 extends beyond the volume of the input model 200, and a portion 218 covers the open door 202 in the input model 200. The occluder 214 thus violates conservativity. In some embodiments, the occluder 214 may include 231 faces.

The methods of Simplygon and Silvennoinen assume buildings are viewed faraway, and do not respect concave and/or interior building structures. Thus, when game characters enter those areas, such output occluders would fail to provide accurate occlusion.

Instead of relying on one strategy and hoping that it is general enough to handle all building models with different styles, embodiments disclosed herein involve first generating two coarse meshes from the input mesh using two different methods. The two coarse meshes are combined to populate the candidate face set as a large solution space. FIG. 2E shows an occluder generated using the methods and systems disclosed herein. In some embodiments, the occluder 214 may include 231 faces.

The candidate face set of the occluder is evaluate using the precision and recall metrics with respect to the input model over the 3D evaluation domain. The methods and systems described herein uses an algorithm based on the metrics to select the best face set from the solution space (e.g., the candidate face set) with a high occlusion rate while preserving the conservativity as much as possible. The methods and systems also involve incorporating one or more strategies to accelerate metric computation at runtime.

In some embodiments, the methods and systems described herein are verified using 77 building models having various styles. In some embodiments, the methods described herein generate occluders with a low face count of 260 while achieving an averaged precision of 99.4% and an averaged Recall of 78.0% from all possible viewer positions, including faraway, close-up, and walk-in views. Such results reflect a 3.7% and 2.9% percent increase compared to occluders generated by Simplygon in terms of precision and recall, respectively, while also using 50 fewer faces on average. The results using the method of Silvennoinen only have a recall of 39.7% on average.

Related techniques of occlusion culling, mesh simplification, and occluder generation are summarized below.

Occlusion Culling: For static scenes, one may pre-compute and store a potentially visible set with respect to a single viewpoint or a region of viewpoints. Regarding buildings with accessible interiors, cell-and-portal decomposes the interior into rooms (cells) connected by doors or windows (portals). However, it may be expensive to pre-compute and store the visibility data for complex scenes in large open worlds. To avoid excessive pre-computation and storage, a view-dependent subset of the input mesh may be maintained as virtual occluders at runtime.

Mesh Simplification: Software rasterization may be used for rendering the coarse mesh (occluder) into a depth buffer, which is then used to cull hidden objects at a very early stage. Generating an approximate coarse mesh from a fine-detailed one may be achieved by collapsing edges satisfying certain conditions or minimizing certain metrics, e.g., the Quadric Error Metrics (QEM). Other metrics, such as defining a surface visibility metric, have been added to the collapsing conditions for specific applications. Other techniques involve satisfying hard constraints during remeshing. For example, progressive hulls are introduced to guarantee all vertices are outside the input mesh, or generating coarse meshes while maintaining strict nesting. Unfortunately, these methods do not work well in topologically inconsistent cases. For example, a topologically inconsistent case may involve an edge (or face) within an open structure as described earlier, in which two connected faces may have reversed normal directions.

Occluder Generation: Conservative mesh simplification may be used to generate occluders for terrain patches in games, assuming clean topologies. Existing mesh simplification methods may be used to generate occluders if topologies can be made consistent. To this end, voxelization may be used. For example, a set of planes inside the voxelized input model is selected to form an occluder with bounded occlusion error. However, the use of a voxelized mesh as the input can introduce a large occlusion error during voxelization. Also, buildings with nested structures can be non-orientable and cannot be voxelized, while thin walls cannot be captured at an affordable resolution. In the game industry, collision meshes have been used as a starting mesh for simplification to avoid creating occluders for all buildings by hand. However, collision meshes are typically larger than the input mesh, significantly violating conservativity.

EXAMPLE EMBODIMENTS

In some embodiments, an input building model (e.g., input model 200) is represented as triangle/polygon soups, including hundreds of (possibly self-intersecting) disconnected components, nested structures, and thin features. Due to the topological complexity, neither voxelization nor conventional mesh simplification can work well by themselves. The methods and systems described herein recognize that some disconnected components contain a number of large patches that are useful candidates to form the final occluder mesh, while other large volumetric features can be well captured by voxelization. Therefore, the methods and systems described herein use a hybrid approach, as demonstrated in FIG. 3D, of combining the outputs from the two mesh simplification strategies, patch-based simplification, as shown in FIG. 3B, and voxelization-based simplification, as shown in FIG. 3C, to form a large candidate set of faces, as the initial occluder $M_{occluder}$ (shown in FIG. 3D). Two evaluation metrics: precision P and recall R are formulated for $M_{occluder}$. A metric-guided mesh simplification of $M_{occluder}$ is used to extract a high-quality final occluder from the initial occluder, as shown in FIG. 3E. The metric-guided mesh simplification terminates when user-specified quality bounds are reached. FIG. 3A shows an input model 300. FIG. 3B shows a result 302 of patch-based simplification of the input model 300. FIG. 3C shows a result 304 of voxelization-based simplification of the input model 300. FIG. 3D shows a combination 306 of the result 302 of the patch-based simplification and the result 304 of the voxelization-based simplification. FIG. 3E shows a final occluder 308 after the metric-guided mesh simplification.

Initial Occluder Generation

A two-way hybrid method is used to form the initial face candidate set.

Patch-Based Mesh Simplification

The first approach performs one of the following steps to generate a coarse mesh:

1. Planar patches grouping: group a pair of faces into a planar patch if the dihedral angle of one shared edge is smaller than a threshold. In some embodiments, the threshold is less than $1\times10^{-2}$, less than $5\times10^{-3}$, about $1\times10^{-3}$. In some embodiments, the threshold is $1\times10^3$.

Figure 4B:
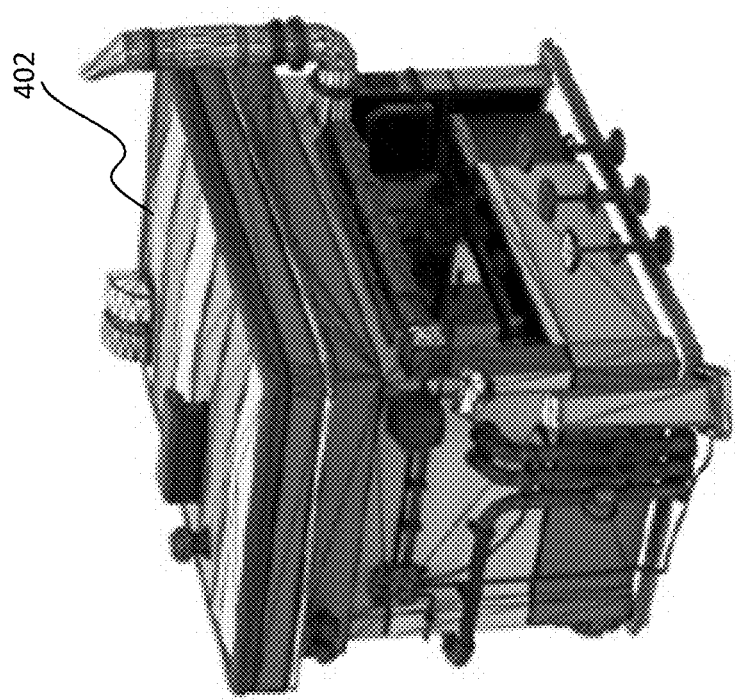
FIGS. 4A and 4B depict planar and curved patches obtained using different types of grouping of the input model according to some implementations of the present application.
Figure 4A:
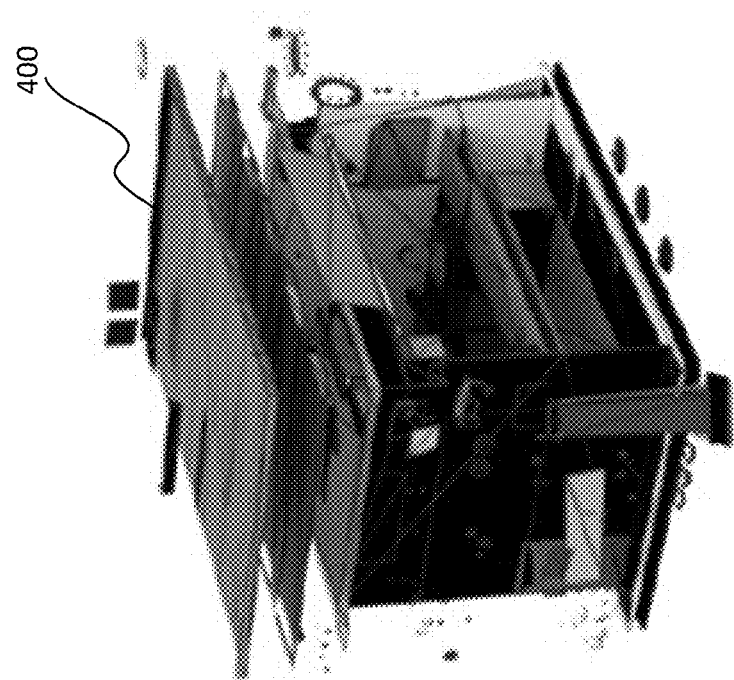

2. Curved patches grouping: group planar patches generated from the last step into curved patches if the dihedral angle of one shared edge is less than the user-specified threshold $\varepsilon_a$. The user-specified threshold $\varepsilon_a$ is smaller than the threshold used for planar patches grouping. Using planar patches may lead to an occluder with a smaller number of triangles, while using curved patches capture more details. Combining these two patch sets leads to a large candidate set, from which the final occluder is selected. An example is shown in FIGS. 4A and 4B. FIG. 4A shows planar patches 400 obtained using planar patches grouping of the input model 300. FIG. 4B shows curved patches obtained using curved patches grouping of the input model 300.

3. Simplification: In some embodiments, each curved patch is simplified with QEM-guided mesh simplification. Other methods, such as variational shape approximation (VSA), can also be used. In some embodiments, boundaries of each 2D-projected patch of each of the planar patch is simplified using the Ramer-Douglas-Peucker algorithm. There are a number of simplification methods, and the main idea is to remove a vertex that has less impact to the shape. After simplification, the boundary is re-triangulated into a triangle mesh using constrained Delaunay triangulation. While other methods be used, Delaunay triangulation is one of the most popular and useful one.

4. Hole filling: If a hole is present in the triangle mesh from Step 3, but $M_{Input}$ does not include such a hole, then the hole in the triangle mesh is filled. The hole is filled by multiple triangle faces, depending on the edge number of the hole.

5. Reduction: The mesh simplification process then sorts all planar and curved patches according to their areas and patches (or faces) are added to the final mesh until the face count reaches a user-specified number $N_P$. In some embodiments, there is not a preference to pick curved patches over planar patches, only a patch's area is used for the selection process.

Hole-Filling

In some embodiments, hole-filling is a mesh-repairing technique. For building models, however, some holes correspond to building decorators, e.g., windows and doors, which must be left open for the conservativity of the occluder.

Figure 5:
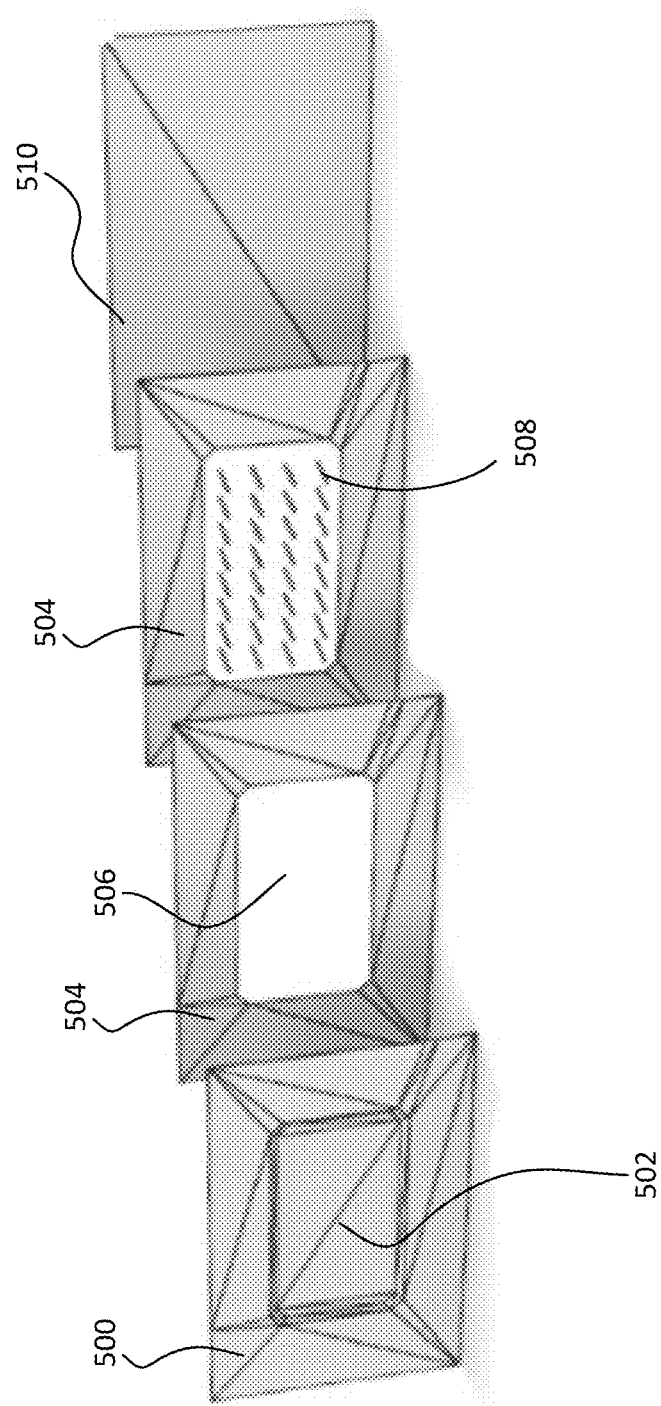
FIG. 5 shows a verification process that checks whether a hole corresponds to a decorator according to some implementations of the present application.

FIG. 5 shows a verification process that checks whether a hole corresponds to a decorator. FIG. 5 shows an input mesh 500 (e.g., $M_{input}$) having a concave "window" 502. The verification process begins by triangulating the hole into several faces. The hole itself, which is defined by the boundary edges, does not have any face. Only when the hole is filled would there be several faces associated with the hole (e.g., for filling the hole). For example, FIG. 5 shows a planar patch 504 with a hole 506 extracted from the input mesh 500. A set of testing line segments with length $l_s$ is uniformly sampled inside each face along its normal direction. For example, FIG. 5 shows testing line segments 508 placed within the hole 506 in the planar patch 504. As long as there is one segment that does not intersect with $M_{input}$, it would be determined that there is a hollow structure in $M_{input}$ and keep the hole open. If all segments hit the input mesh, then no openings exist in $M_{input}$ and the hole can be filled safely. After hole-filling, the methods and systems mesh-simplify the patches to further reduce the face count. For example, FIG. 5 shows an output mesh 510 after hole filling and remeshing.

Voxelization-Based Mesh Simplification

The second approach of voxelization-based mesh simplification generates candidate faces includes one or more of the following steps:

1. Voxelization: Voxelize the input model $M_{input}$ into voxels, each having an edge length of $1/64$, where 1 is the diagonal length of the bounding box of $M_{input}$. A 3D winding number is calculated for each voxel, and an isosurface mesh is extracted (e.g., using a marching cube algorithm, an isosurface mesh corresponding to particular winding number (e.g., 0.5, 1, 1.5) is extracted. A lower winding number means the voxel mesh is larger than the input mesh, which may lead to a higher R but a lower P, in some embodiments.

2. Remeshing: the isosurface obtained from step (1) is simplified into a coarse mesh, $M_{coarse}$. for example, using QEM-guided method. Other methods, such as Variational Shape Approximation (VSA) may also be used for the simplification.

3. Conservative enforcement: The simplified mesh $M_{coarse}$ obtained from step (2) is projected back onto the isosurface from step (1) to enforce conservativity.

Conservative Enforcement

QEM-based simplifications may not be conservative, resulting in a coarse mesh $M_{coarse}$ having vertices that are outside the input mesh $M_{input}$. Such a coarse mesh may occlude objects that should actually be visible, causing false negatives. An optimization algorithm is used to push the obtrusive parts (e.g., parts extending beyond the input mesh $M_{input}$) back into the input mesh $M_{input}$.

The optimization algorithm begins by computing a signed distance field φ, representing a signed distance between the $M_{coarse}$ and the isosurface, before solving the following optimization equation:

$$\min_{x \in \mathcal{R}^{3n}} \sum_i E_i(x) \text{ s.t. } \phi(p) \leq 0, \forall\, p \in M_{coarse} \quad (1)$$

where x is a vector corresponding to the vertex positions of $M_{coarse}$ and p is any point on $M_{coarse}$.

Each edge in $M_{coarse}$ is defined as spring energy $$E_i = \frac{1}{2}(\|p_0 - p_1\| - r)^2$$

where $p_0$ and $p_1$ are edge ending points and r is the edge length prior to conservative enforcement.

In some embodiments, $M_{coarse}$ is a triangular mesh or a polygonal mesh. To formulate the unilateral constraints in the above optimization problem, the methods and systems described herein detect contacts (or collisions) between the $M_{coarse}$ and the signed distance field φ. A collision happens, if any point on a face of $M_{coarse}$ has a signed value that is larger than 0. The methods and systems described herein check if a collision happens at each step during optimization. When a collision happens, the following soft SDF penalty energy is added to the objective function:

$$E_{SDF}(p) = \begin{cases} \frac{1}{2}\phi(p)^2 & \phi(p) > 0 \\ 0 & \phi(p) \leq 0 \end{cases}$$

to replace the hard constraints in Equation 1. Putting things together, the optimization is reformulated into the following unconstrained form:

$$\operatorname*{argmin}_{x \in \mathcal{R}^{3n}} \sum_i E_i(x) + \sum_i E_{SDF}(p_i) \quad (3)$$

In some embodiments, this method is essentially a penalty method for handling hard constraints with automatic parameter tuning. Although no weight is introduced for $E_{SDF}$, if the same continuous collision happens repeatedly, more $E_{SDF}$ terms will be added, essentially increasing its weight. Since $M_{coarse}$ typically has less than 100 vertices, in some embodiments, Quasi-Newton method is used to solve the optimization. Newton's method is another method for solving the optimization.

Figure 6:
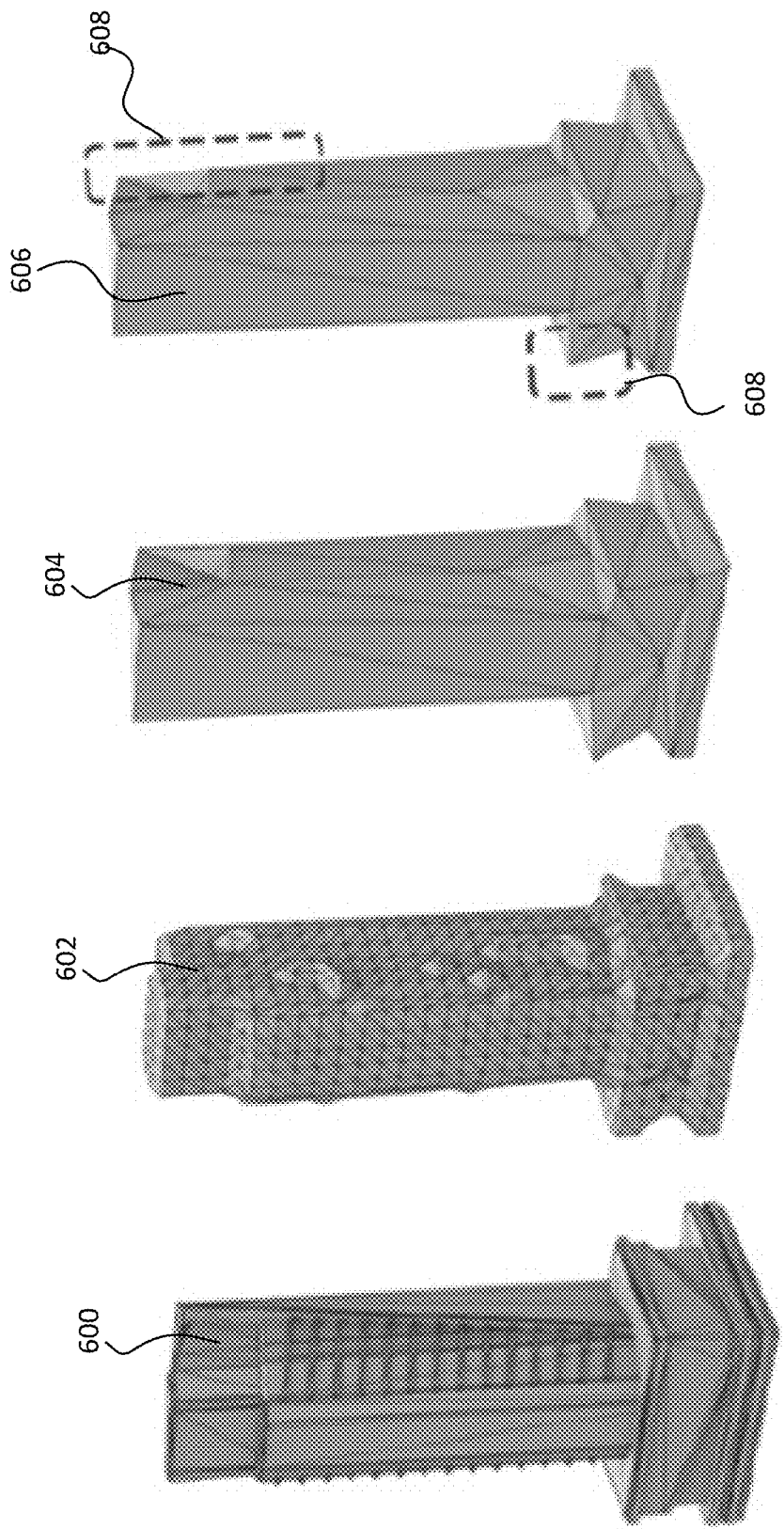
FIG. 6 shows an example of voxel-based mesh simplification according to some implementations of the present application.

FIG. 6 shows an example of voxel-based mesh simplification. An input model 600 is provided, from which an isosurface 602 is obtained. The isosurface 620 is simplified into a simplified mesh 606. Some portions of the simplified mesh 606 is non-conservative (e.g., extends beyond the volume of the input model 600. A final mesh 608 enforces conservation by pushing faces 610 back into the final mesh 608. As the sharp corners highlighted in the faces 610 in FIG. 6, the methods and systems described herein push the coarse mesh into the building to improve precision.

Occlusion Evaluation

Two metrics, precision P and recall R of an occluder $M_{occluder}$ for an input model $M_{input}$, to evaluate the quality of the occluder, and to guide further mesh simplification procedures.

Figures 7A, 7B:
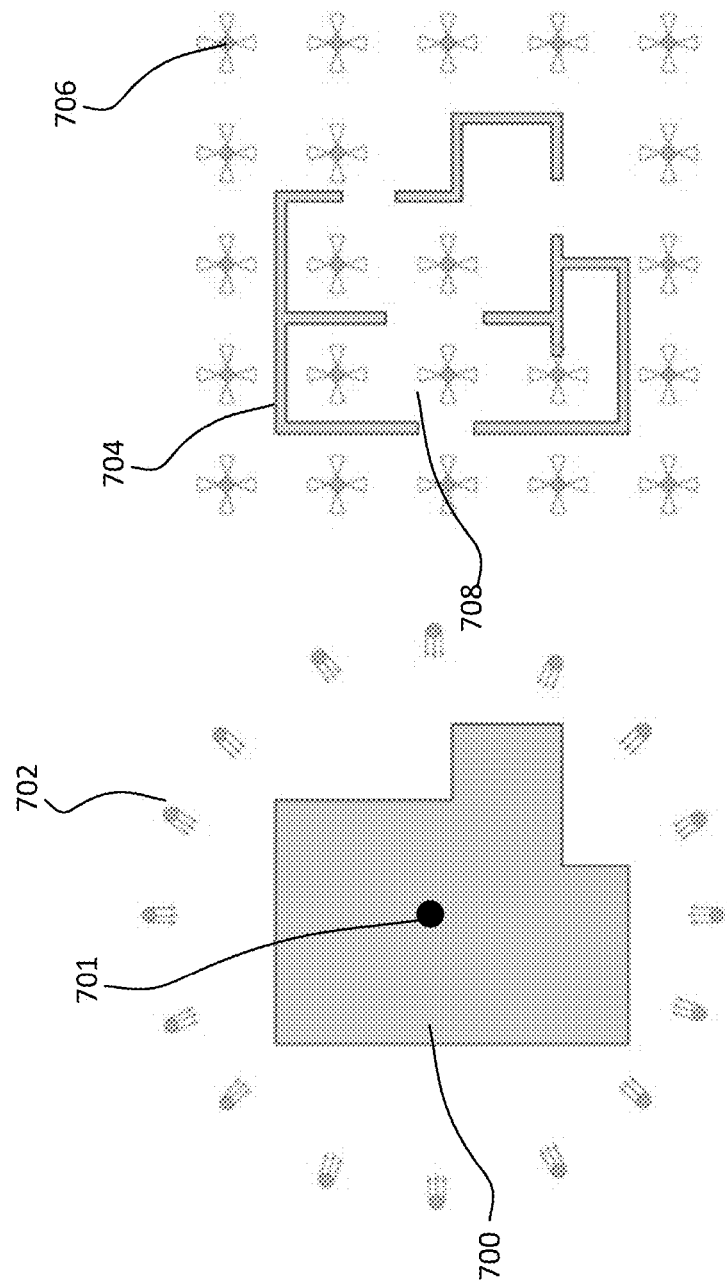
FIGS. 7A and 7B compare different view sampling methods according to some implementations of the present application.

FIG. 7A shows an evaluation scheme in which both the occluder and the structure (e.g., a building 700) are placed at an origin 701 while the viewer (represented by view points 702) is positioned outside the structure building and faces the origin. The evaluation methods described here, as shown in FIG. 7B, allows players to walk through the structure (e.g., a building 704 having inner walls, caves, tunnels, and buildings), and take into account camera views from interiors 708 and concave areas of such structures. For example, FIG. 7B shows sampling over the 3D space, include a point 706. At each point, including the point 706, all cameras views (e.g., four directions: up, down, left, and right) are evaluated, including interiors and concave areas. Thus, the evaluation methods include calculating precision P and recall R over the 3D evaluation space. A player can omnidirectionally look into ambient space at any accessible location over the 3D space. The evaluation domain is defined as $B' = (1+\varepsilon_{padding})B - M_{input}$.

B' is the difference between an enlarged volume B of the bounding box of $M_{input}$ (enlarged by $(1+\varepsilon_{padding})$) and the volume of $M_{input}$. The overall precision P and recall R are given as:

$$P = \frac{1}{|B'|}\int_{B'} P_x dx \text{ and } R = \frac{1}{|B'|}\int_{B'} R_x dx \quad (4)$$

The integrals above are numerically approximated by uniformly dividing B' into volume blocks with spacing Δx. All volume blocks outside $M_{input}$ are marked as valid. The overall precision $\mathcal{P}$ and recall $\mathcal{R}$ are computed as:

$$\mathcal{P} = \frac{1}{\Sigma \Delta V}\Sigma^N P_x \Delta V = \frac{1}{N}\Sigma^N P_x \quad (5)$$

$$\mathcal{R} = \frac{1}{\Sigma \Delta V}\Sigma^N R_x \Delta V = \frac{1}{N}\Sigma^N R_x$$

where N is the number of valid blocks and $\Delta V = \Delta x^3$ is block volume.

$P_x$ and $R_x$ denote the precision and recall at the block center x.

For computing $P_x$ and $R_x$ at a fixed camera position (e.g., block center x) the full view direction space is discretized into 6 view frustums along the ±X,Y,Z axes, each having a 90° view angle. The block center is the location of the fixed camera position in the evaluation.

In some embodiments, occlusion computations are reduced from 3D space to 2D screen space by comparing the 2D areas occluded by each of $M_{occluder}$ and $M_{input}$. Monte-Carlo sampling is used to approximate $P_x$ and $R_x$ for each view frustum.

Three possibilities exist for each of the $N_{quad}$ randomly sampled, axis-aligned quads rasterized as occludees over the evaluation space (e.g., 2D screen space, a 2D plane in a 3D virtual space):

(1) true positive: the quad is covered by both $M_{occluder}$ and $M_{input}$. The number of pixels in such a quad is denoted as $N^t$;

(2) false positive: a quad is entirely covered by $M_{input}$ but not $M_{occluder}$. The number of pixels in such a quad is denoted as $P^f$;

(3) false negative: a quad is completely covered by $M_{occluder}$ but some pixels are not covered by $M_{input}$. The number of pixels uncovered by $M_{input}$ in this quad is denoted as $N^f$.

Discretized $P_x$ and $R_x$ are computed as:

$$\mathcal{P}_x = \frac{\Sigma N_i^t}{\Sigma N_i^t + \Sigma N_i^f}, \mathcal{R}_x = \frac{\Sigma N_i^t}{\Sigma N_i^t + \Sigma P_i^f} \quad (6)$$

where the summation is over all six directions ±X,Y,Z.

Metric-Guided Occluder Simplification

Combining the results from patch-based (e.g., result 302) and voxel-based simplification (e.g., result 304) methods, a high-quality face candidate set is generated (e.g., combination 306) The final step includes using a metric-guided face reduction algorithm to select a face subset to form the final occluder, while maintaining its occlusion quality. A naive approach to this end is to greedily remove faces that produce the smallest recall reduction $\Delta R$. However, in some embodiments, this would be too computationally expensive. For a combined mesh $M_{combined}$ (e.g., combination 306) having m faces, when n view position samples are used to compute the recall, $6n\Pi_{i=m}^{i=m-k}$ i visual evaluations are made in order to remove k faces. Instead, the methods and systems described herein perform the following steps in the simplification algorithm: All faces are checked, if removing face $f_i$ would lead to a precision change $P(M)-P(M-f_i) > \varepsilon_P$, $f_i$ is removed from $M_{combined}$. P is not updated after discarding $f_i$, since removing one face from the occluder does not increase $P(M-f_i)$. The next step checks all the remaining faces again. If removing $f_i$ would lead to $\Delta R < \varepsilon_R$, $f_i$ is removed from $M_{combined}$ and R is updated. R is updated during each iteration, since removing one face may increase other faces' contributions to the recall.

The strategies of (1) reducing adjacent views, and (2) skipping unnecessary evaluations further accelerate the metric-guided occluder simplification.

Sampled View Reduction:

When two views are close to each other, the difference between their occlusion results will be small. Thus, in some embodiments, the number of view samples are reduced by merging neighboring ones.

Figures 8A, 8B, 8C, 8D:
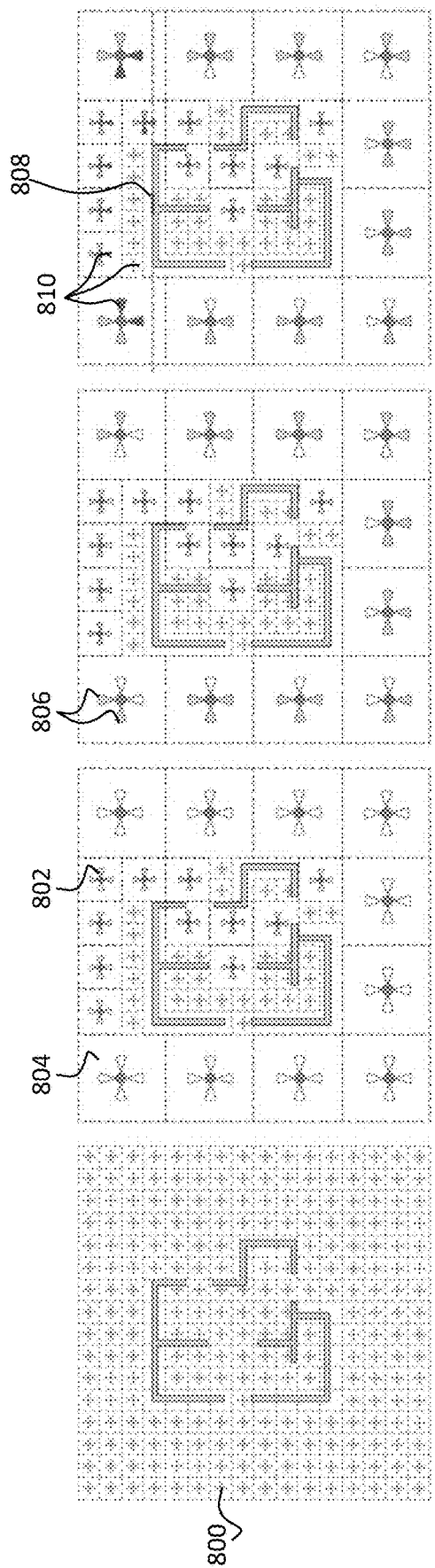
FIGS. 8A to 8D show an example of occlusion measure acceleration according to some implementations of the present application.

For example, in some embodiments, the method includes uniformly dividing the domain B into N equally sized blocks (uni-size blocks 800) as shown in FIG. 8A. In other words, the empty space is discretized into a number of the uni-size blocks 800. The method replaces 2×2×2 adjacent blocks with a larger one (e.g., a larger block 802, and a largest block 804) until no further merges can be performed, as shown in FIG. 8B, in a similar way as an octree. At each block, there are six views directions along ±X, Y, and Z. No merging occurs if a center of any of the block is inside a building. Equation 5 is reformulated as $$R = \frac{1}{\Sigma \Delta V_i} \Sigma^N R_\Omega(x_i) \Delta V_i \quad (7)$$

where $\Delta V_i$ and $x_i$ are the i-th sample's block volume and center location, respectively.

Sample Skipping:

When a structure (e.g., a building) is outside a view frustum of a view location, $N^t$, $P^f$, and $N^f$ would be zero. Thus, prior to simplification, in some embodiments, one or more views (e.g., a majority of the views, all of the views) is tested, and marked to skipping if the view cannot see the structure at all. FIG. 8C shows, in grey, the views (e.g., views 806) marked for skipping because the grey view directions cannot see the building.

In some embodiments, when a face 808 is removed, as shown in FIG. 8D, it would not change the metric value measured from views that cannot see the face. Hence, the evaluation domain is separated into two parts by the orientation of the face. Metric values are updated for those view locations 810 lying on the positive side of the face 808 (e.g., positive side of the face normal), as demonstrated in FIG. 8D.

Example Implementations

In some embodiments, the methods and systems are implemented in C++ with CGAL and libigl. To evaluate occluders and compute our metrics, a fast, parallel software rasterization on CPU in Unreal Engine 4 is used. Specifically, the input model and occluder are rasterized into the depth buffer. Then, a number of quads are randomly generated on the depth buffer and the precision and recall rates are calculated using Equation 6. To avoid too many empty pixels in the depth buffer, the minimum length of the input model's bounding box is used as the $\varepsilon_{padding}$. In some embodiments, the methods were implemented on a computer with AMD Ryzen Threadripper 3970X 32-Core Processor @3.69 GHz with 256 GB RAM.

Ablation Study

Figure 9B:
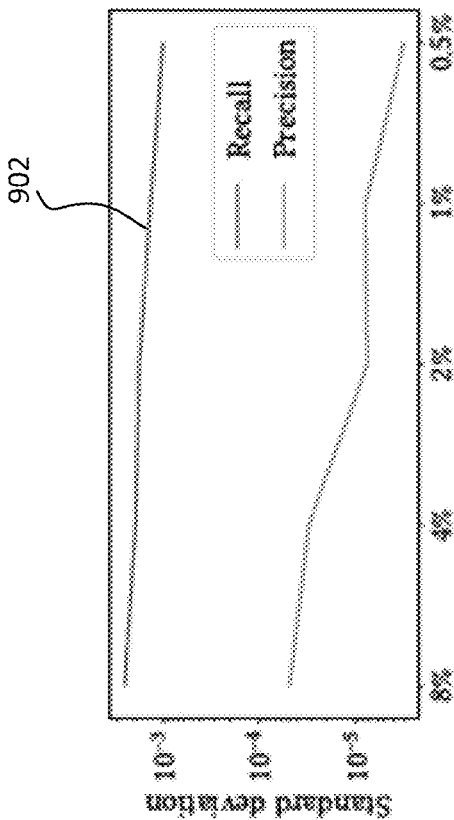
FIGS. 9A and 9B show standard deviation for the recall and precision of different quad numbers per view and different sampling distances according to some implementations of the present application.
Figure 9A:
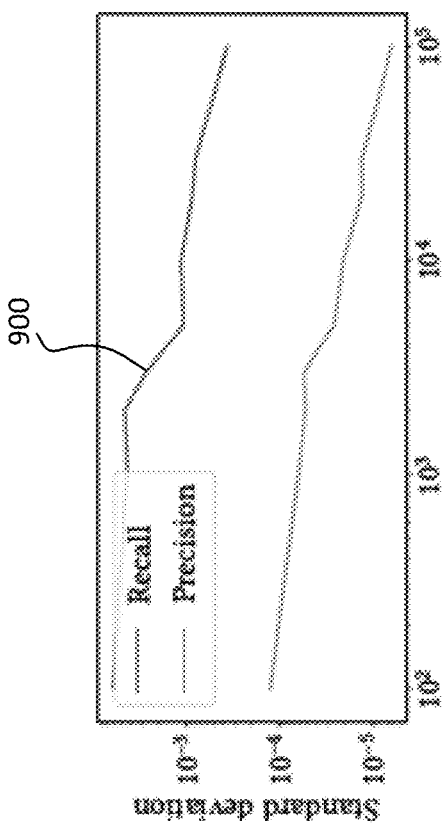

Metric Discretization Precision:

$N_{quad}$, the number of screen quads, can impact the precision of approximate metric computations in some embodiments. Using an example building model (shown in FIG. 2A), metrics are computed using 100; 1,000; 5,000; 10,000; 20,000; 30,000; and 100,000 quads per view, respectively, using the actual screen size for software rasterization in mobile games (e.g., 256×256). For each quad number, metrics are computed ten times with different sets of randomly picked quads. FIG. 9A shows the standard deviation of the ten metrics. A plot 902 shows the standard deviation for the recall at different quad numbers per view. The other plot in FIG. 9A shows the standard deviation for precision. 5,000 quads per view throughout the rest of the experiments to balance computational cost and accuracy.

Sampling Distance:

$\Delta x$, view sample spacing, can impact an accuracy of the metric approximation accuracy. Halving the sampling distance would increase the computational cost by a factor of 8. Experiments were performed with 8%, 4%, 2%, 1%, and 0.5% of the largest diagonal length of $M_{input}$'s bounding boxes. Similarly, metrics were computed ten times under each sampling distance. FIG. 9B shows the standard deviations for both recall and precision. FIG. 9B shows a plot 904 for the standard deviation for the recall at different sampling distances. Since the standard deviation of recall at 4% and 2% are very close, $1.9 \times 10^{-3}$ and $1.8 \times 10^{-3}$ respectively, 4% were used as the sampling distance throughout the rest of the experiments.

Samples Reduction:

Sample reduction and/or sample skipping can accelerate metric computation, which in turn speeds up metric-guided mesh simplification. Through testing all 77 models, the results show the total number of evaluation tests is reduced to 16.3% of the number of tests without using any evaluation acceleration techniques. The ratio is further reduced to 13.1% and 5.9% after skipping sample views that cannot see the model and or the just removed face. Although there is no visible difference between the reduction results with/without sample reduction, there is a 0.5% and 0.2% fluctuation in precision and recall, respectively, while sample reduction can save 83.7% samples on average. Overall, the computation time can get 5.56× speedup by using sample reductions. Sample skipping does not impact the accuracy of the evaluation results.

Experiments

Figure 10:
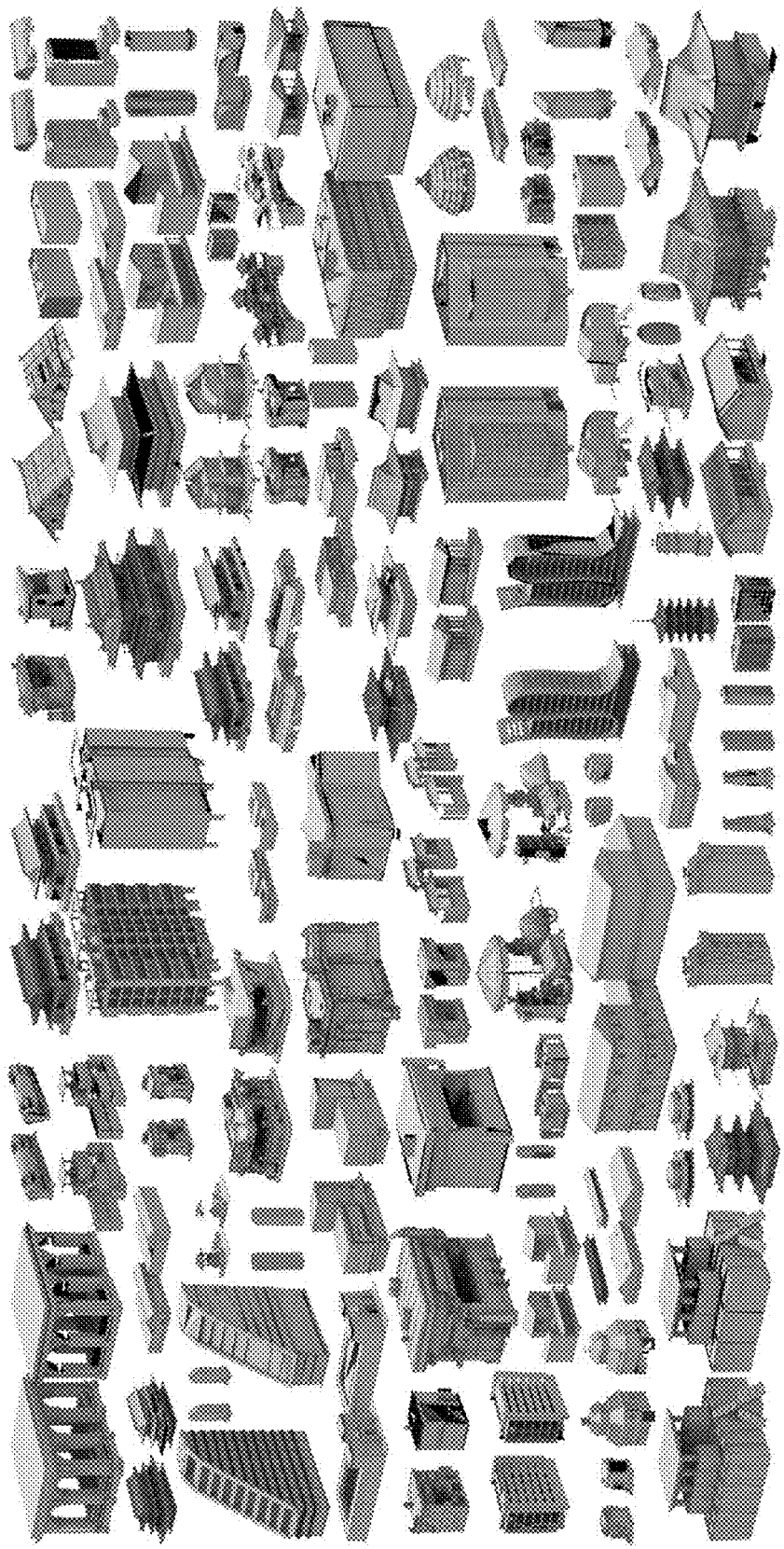
FIG. 10 shows a dataset of 77 building models used for games according to some implementations of the present application.

The methods and systems described herein were evaluated using a dataset of 77 building models used for games, as shown in FIG. 10. Each building has hundreds of components and thousands of intersected triangle pairs, making processing with conventional mesh simplification methods extremely difficult, if not impossible. 5000 randomly generated quads was rasterized on the depth buffer to collect information for computing precision and recall to evaluate the generated occluder. $l_s=1\%$ is set as the largest diagonal length of $M_{input}$, bounding boxes. $l_s$ is also defined above as the testing line segment lines for the "hole-filling" procedure. All hyperparameters are listed in Table 1. A hyperparameter refers to a parameter that, prior to the methods and systems described herein, is typically manually tuned by technical artists who design video game graphics based on their experience. There is no theorical explanation why a parameter should carry a particular value.

TABLE 1

Hyper parameters.

| Parameters | Values |
| --- | --- |
| $\varepsilon_a$ | $\pi/3$ |
| $N_P$ 600 | 600 |
| $\varepsilon_P$ | $1 \times 10^{-3}$ |
| $\varepsilon_R$ | $1 \times 10^{-3}$ |

Figure 11:
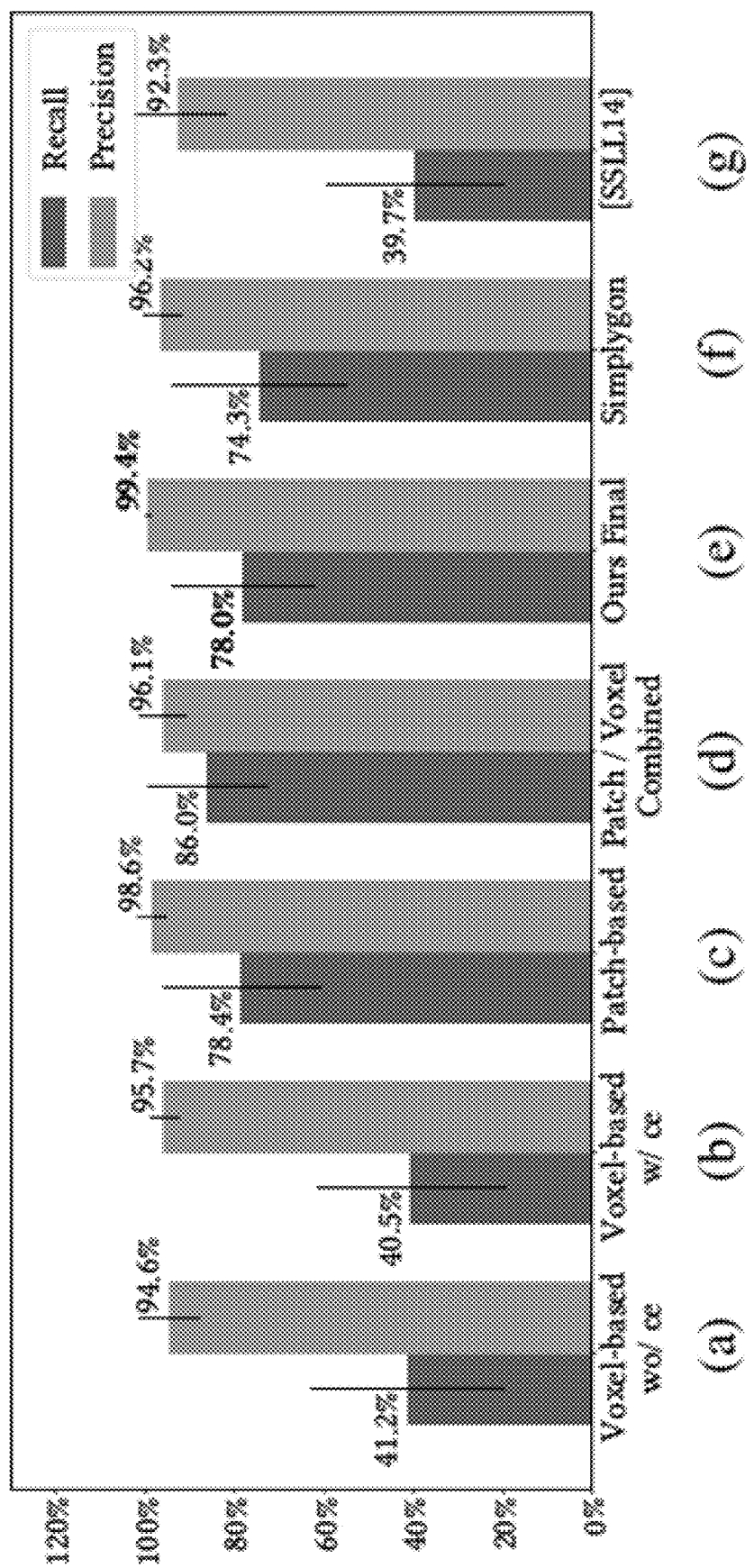
FIG. 11 shows average recall and precision for various testing buildings according to some implementations of the present application.

On average, occluders generated using the methods and systems described herein have 260 faces with a recall of 78.0% and a precision of 99.4%, as shown in FIG. 11 and Table 2. FIG. 12 also shows 10 example buildings and corresponding occluders generated by Simplygon and the methods and systems described herein.

Conservative Enforcement: FIG. 11 shows that conservative enforcement can improve the precision from 94.6% (FIG. 11(a)) to 95.7% (FIG. 11(b)). With the improved precision, however, comes a reduction in the recall, which is understandable. When making a given coarse mesh strictly within the input mesh, some areas exist where the coarse mesh does not fill. In some embodiments, higher precision is preferred even with a loss of recall since false culling leads to severe visual artifacts. The precision of voxel-based results may be lower than that of patch-based solutions, since isosurface generation is based on winding numbers for inside-outside segmentation, which can lead to precision error.

Combining Patch/Voxel-based results: FIG. 11 shows, using the patch-based (FIG. 11(a)) and voxel-based (FIG. 11(c)) method as the face candidate set, the generated occluder has a recall of 41.2% and 78.4% and a face number of 500 and 53, respectively.

The combined candidate set in FIG. 11(d) leads to a significantly higher recall of 86.0%. One example of combining patch-based and voxel-based results can be found in FIGS. 3A-3E.

Timing: Throughout the 77 testing building model, the methods and systems described herein take 155 seconds on average (Table 2), while patch-based mesh simplification and voxel-based mesh simplification take 5 seconds and 24 seconds, respectively. It takes 126 seconds to further reduce the face number from 553 to 260 by metric-guided mesh simplification.

TABLE 2

Average face number and computational over 77 testing buildings using the described methods, Simplygon, and planar occluder.

| | Voxel-based | Patch-based | Patch/Voxel Combined | Metric-Guided Simplification | Ours Final | Simplygon | Silvennoinen |
| --- | --- | --- | --- | --- | --- | --- | --- |
| Face Number | 53 | 500 | 553 | — | 260 | 300 | 127* |
| Time (s) | 5 | 24 | — | 135 | 154 | 3 | 267 |

*For single-sided rendering, the number needs to be doubled.

Comparison with Simplygon Using the visibility-driven mesh simplification pipeline in Simplygon, the target triangle count is set as 300, an occluder face count commonly used in mobile games. Simplygon preserves the silhouette at a reasonably fast speed (3 seconds per model), with a recall of 74.3%, which is 3.7% lower than that obtained using the methods and systems described herein. However, Simplygon fails to keep the conservativity (a precision of 96.2% versus the precision of 99.4% obtained using the methods and systems described herein). More importantly, the standard deviation of the precision obtained using the methods and systems described herein is only 0.6% while that of Simplygon is 4.3%, showing that the methods and systems described herein have a more stable performance. A lower precision is more detrimental than a lower recall. With a low recall, the system has to render more hidden objects, which will hinder the rendering efficacy. However, a low precision can cause an object to be wrongly culled even when it is visible to the player, as shown in FIGS. 1B and 1C. For the first model in FIG. 12, even if the occluder generated by Simplygon can capture the overall input shape, its recall is only 66.9% due to the small cracks in between the disconnected walls, which significantly weaken its occlusion power.

Comparison with Planar Occluder: To compare with a planar occluder, the input mesh is first voxelized to generate an isosurface. The Silvennoinen method assumes the building model is viewed from far away, and generates only one plane for each view direction. After choosing a set of planes, Silvennoinen's method greedily removes the triangle with the minimal area rather than minimizing the loss of recall. The methods and systems described herein optimizes by evaluating the occlusion whenever a face is discarded to more accurately reduce faces. Even with such optimization, the output planar occluders can only achieve an averaged recall of 39.7% and a precision of 92.3%. One reason is that test models contain thin walls and nested structures that are difficult to voxelize correctly. Thus, the output isosurface only captures a small portion of the input mesh with a large precision error, which can also be observed in our voxel-based results (only a recall of 41.2%). Regarding the computation time, Silvennoinen's method takes 267 seconds per model, which is slower than the methods and systems described herein, while Silvennoinen's occlusion metric is only half that obtained using the methods and systems described herein. Silvennoinen's method also assumes double-sided rendering. For the culling method with single-sided rendering, the face number of occluders has to be doubled. For proper comparison, Silvennoinen's target output face count is set as 150 and the face count is doubled during runtime, since the game engine (based on Unreal Engine 4) used in some embodiments of the methods and systems described herein uses single-sided rendering.

The methods and systems described herein combine patch-based and voxel-based face generation techniques. The best face subset is selected to form an occluder based on novel evaluation metrics. Two evaluation metrics are further introduced over the 3D domain to measure the quality of occluders and several strategies to accelerate the procedure of evaluation are also described. Testing of the methods and systems described herein using 77 building models in Unreal Engine 4, highlights the capability of the method in generating occluders having a higher precision and recall.

The methods and systems described herein are not limited to inputs that are manifold and watertight. Using heuristic, problem-specific techniques involving hyperparameters is another approach. The methods and systems described herein are not limited to only utilizing patch-based and voxel-based mesh simplification tools, results from additional different mesh simplification techniques can be fused to improve the quality of face candidate sets. Further, the metric-guided occluder simplification can include addition operations, such as edge collapse and vertex removal, (though at a cost of a higher computational burden) instead of using only face reduction.

Figure 13:
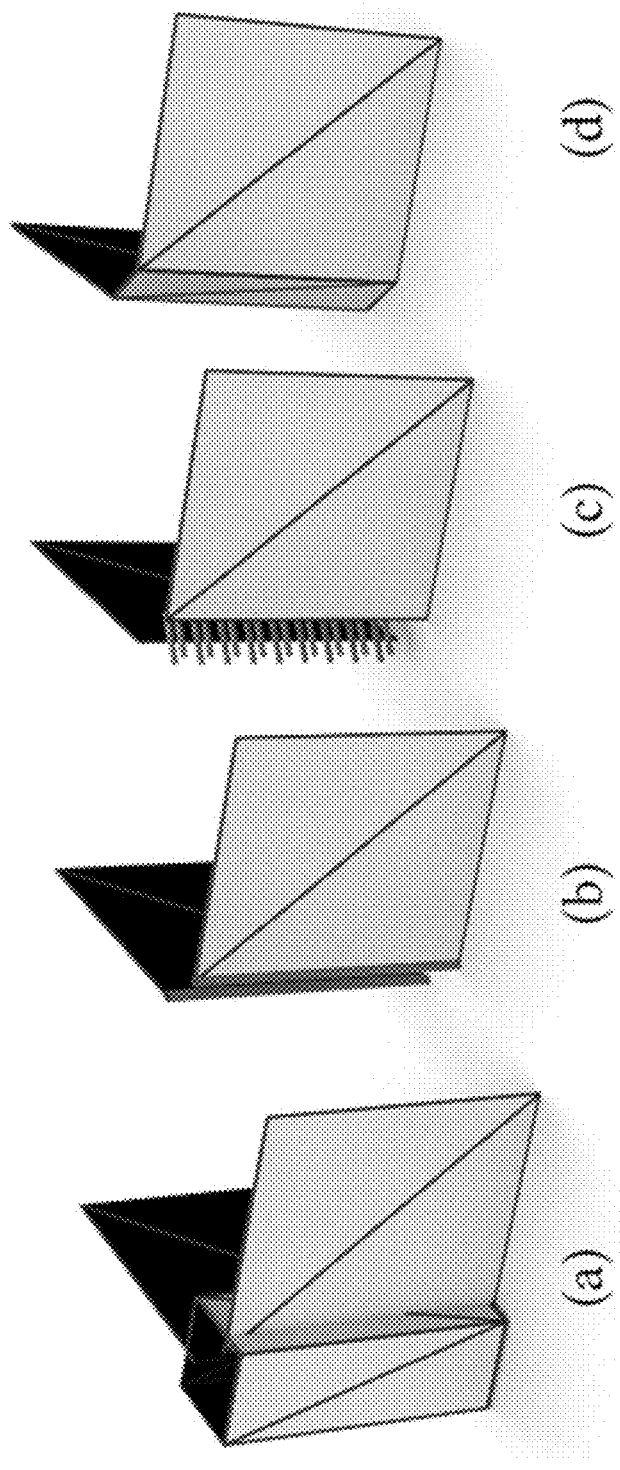
FIG. 13 shows an example of seam closing according to some implementations of the present application.

In some embodiments, seam-closing is used. As illustrated in FIG. 13, once small and narrow patches are removed from the input mesh, seams may arise, which can reduce the precision dramatically. To close these seams, all patches' boundaries are first segmented into a number of straight segments. Assuming there are two segments with lengths $l_i$ and $l_j$ and directions $d_i$ and $d_j$ respectively. If two segments from different patches are parallel with a similar length $$(\widehat{d_i d_j} > \epsilon_s \text{ and } \frac{l_i}{l_j} \in [\frac{1}{1+\epsilon_l}, 1+\epsilon_l]),$$

and the angle between their corresponding patches' normals, $n_i$ and $n_j$, is within a user specified range ($\widehat{n_i n_j} \in [\epsilon_n, 1-\epsilon_n]$), then these two segments will be marked as a candidate pair for closing.

Seam closing is performed by adding a quad Q formed by the four vertices of the two segments. Note that, the candidate will be considered as a real seam only if the gap between the pair is closed in the input mesh, typically via some intersecting narrow patch, e.g., a pillar or round corners. To prevent incorrect seam-closing, a number of testing line segments with length $l_s$ (e.g., $l_s$ is between 50 mm and 200 mm, $l_s$ is 100 mm) uniformly sampled inside Q along the normal direction of Q (FIG. 13(c)). As long as there is one segment having no intersection with $M_{input}$, implying there might be a hollow structure in $M_{input}$, Q will be discard.

FIG. 13(a) shows an input mesh with two walls and one pillar. FIG. 13(b) shows paired segments after patch removal. FIG. 13(c) shows line segments uniformly placed inside the quad formed by segments pair. FIG. 13(d) shows the mesh after seam closing.

Heterogeneous buildings are buildings that are only partially accessible. In some embodiments, the lower parts of the heterogenous building have interior structures and can be walked in by the players, while the upper parts are large closed structures that can only be viewed from the outside. In some embodiments, such heterogeneous building structures can be handled by first splitting the building vertically into two components, applying coarse mesh generation (e.g., patch-based simplification) to only the lower part, and applying mesh simplification with conservative enforcement for the upper part, and then combining the two results as the final coarse mesh.

In some embodiments, a heterogenous building have multiple large horizontal patches (usually floors and ceilings) that are facing downward and can split the building into two components. Our splitting plane is chosen from these candidates. For a candidate plane P, 2D segment soups generated are compared by slicing the building using $P_{+\eta}$ and $P_{-\eta}$, where $P_{+\eta}$ and $P_{-\eta}$ are two planes parallel to P and with a vertical offset $\pm\eta$ (e.g., in some embodiments, $\eta \approx 1 \times 10^{-3}$. A candidate plane is chosen as the final splitting plane if there is a significant area difference between the two segment soups, e.g., the ratio $\epsilon_a$ between their areas is larger than a threshold (e.g., $\epsilon_a=10$). In some embodiments, the plane having a largest difference between the first area and the second area is selected as the final splitting plane.

Figure 14B:
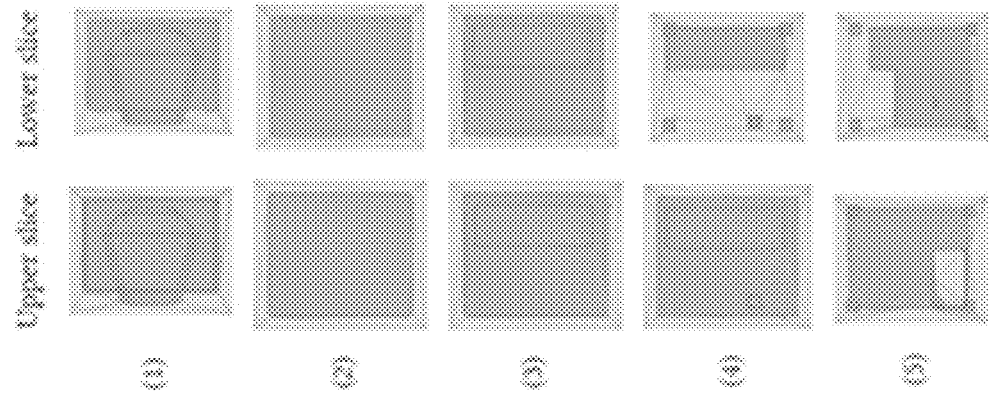
FIGS. 14A and 14B show an example of several candidate splitting planes and their corresponding slice areas for a heterogeneous building model according to some implementations of the present application.
Figure 14A:
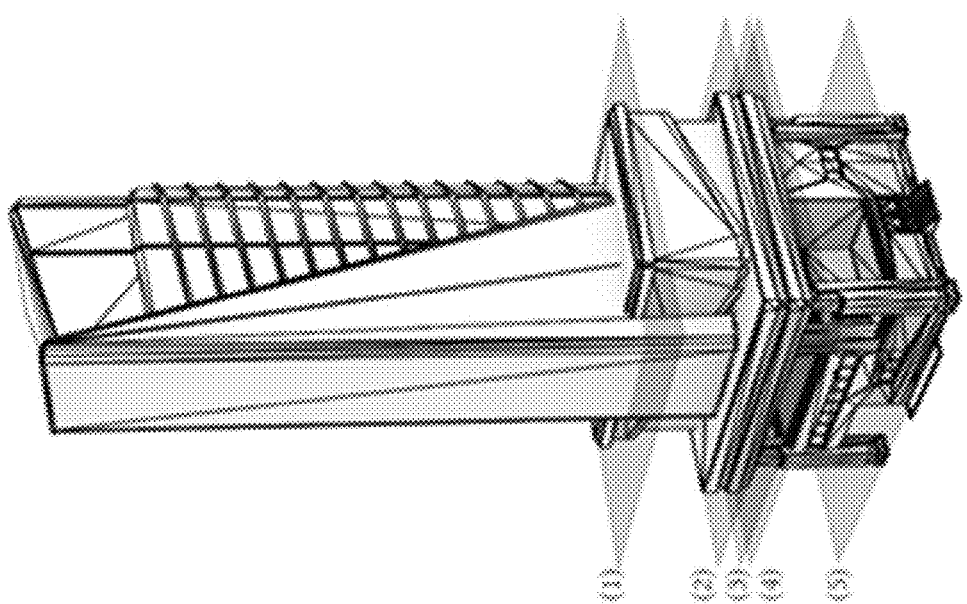

Given a 2D segment soup, its area is computed by first obtaining a closed 2D triangle mesh which can be computed using TriWild and then trivially summing the area of all triangles. FIGS. 14A and 14B show an example of several candidate splitting planes and their corresponding slice areas for a heterogeneous building model according to some implementations of the present application. FIG. 14A shows the input building and five potential transparent splitting planes. The potential transparent splitting planes are candidate planes for splitting the building into two or more portions. FIG. 14B shows upper and lower slices for each splitting plane. 2D intersection segments and interior triangles are shown. In some embodiments, the methods would select splitting plane (4) because the area of the lower slice is significantly smaller than the upper slice.

Figure 15:
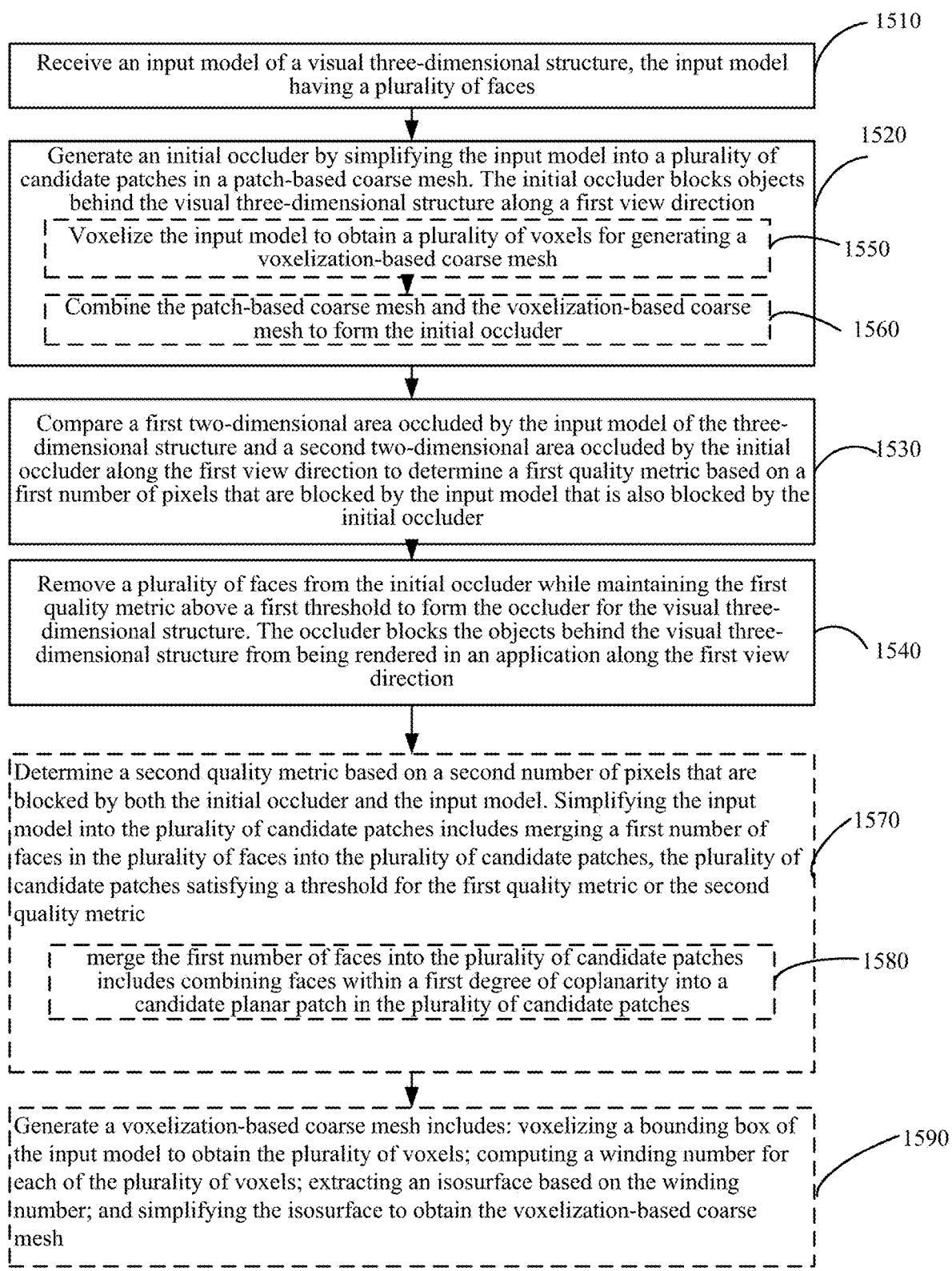
FIG. 15 shows a method for automatically generating an occluder for a visual three-dimensional structure according to some implementations of the present application.

FIG. 15 depicts a process performed by a computing system for automatically generating an occluder for a visual three-dimensional structure according to some implementations of the present application.

First, a computing system receives (1510) an input model of the visual three-dimensional structure, the input model comprising a plurality of faces. Next the computing system generates (1520) an initial occluder by simplifying the input model into a plurality of candidate patches in a patch-based coarse mesh. In some embodiments, the visual three-dimensional structure corresponds to a visual structure in a video game. In some embodiments, the computing system automatically generates the occluder before a user initializes the video game for playing. In some embodiments, the computing system automatically generates the occluder during a production stage of a video game. In some embodiments, after the user initializes the video game, the video game displays structures and images that are not blocked by the occluder. In some embodiments, the visual three-dimensional structure is mapped with textures and colors before being displayed (e.g., during the production stage of a video game, prior to a user initializing the video game). In some embodiments, a coarse mesh is an approximated mesh generated from a fine rendering mesh (e.g., an input mesh, a visual mesh). In some embodiments, the coarse mesh has not undergone refinements (e.g., no metric-based simplifications, not yet checked for conservativity). The initial occluder blocks objects behind the visual three-dimensional structure along a first view direction. In some embodiments, while the occluder is automatically generated during the production stage of a video game, no graphics associated with the visual three-dimensional structure is rendered. The computing system compares (1530) a first two-dimensional area occluded by the input model of the visual three-dimensional structure and a second two-dimensional area occluded by the initial occluder along the first view direction to determine a first quality metric based on a first number of pixels that are blocked by the input model that is also blocked by the initial occluder. The computing system removes (1540) a plurality of faces from the initial occluder while maintaining the first quality metric above a first threshold to form the occluder for the visual three-dimensional structure. The occluder blocks the objects behind the visual three-dimensional structure from being rendered in the application along the first view direction. In some embodiments, the automatically generated occluder is a final occluder that is being used in a video game application (e.g., no initial occluder is used by the video game application at run time).

In some implementations, the computing system voxelizes (1550) the input model to obtain a plurality of voxels for generating a voxelization-based coarse mesh, and combines (1560) the patch-based coarse mesh and the voxelization-based coarse mesh to form the initial occluder. In some implementations, the computing system determines (1570) a second quality metric based on a second number of pixels that are blocked by both the initial occluder and the input model. Simplifying the input model into the plurality of candidate patches includes merging a first number of faces in the plurality of faces into the plurality of candidate patches, the plurality of candidate patches satisfying a threshold for the first quality metric or the second quality metric. In some implementations, the computing system merges (1580) the first number of faces into the plurality of candidate patches includes combining faces within a first degree of coplanarity into a candidate planar patch in the plurality of candidate patches.

In some implementations, the computing system generates (1590) a voxelization-based coarse mesh includes: voxelizing a bounding box of the input model to obtain the plurality of voxels; computing a winding number for each of the plurality of voxels; extracting an isosurface based on the winding number; and simplifying the isosurface to obtain the voxelization-based coarse mesh.

While particular implementations are described above, it will be understood it is not intended to limit the invention to these particular implementations. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present application. First ranking criteria and second ranking criteria are both ranking criteria, but they are not the same ranking criteria.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these

What is claimed is:

1. A method for automatically generating an occluder for a visual three-dimensional structure, the method comprising:
   receiving an input model of the visual three-dimensional structure, the input model comprising a plurality of faces;
   simplifying the input model into an initial occluder including a plurality of candidate patches in a patch-based coarse mesh;
   determining a first quality metric of the initial occluder associated with a precision, wherein the precision is measured by a first number of pixels corresponding to objects behind the visual three-dimensional structure that are blocked by the input model and the initial occluder along a first view direction; and
   removing one or more candidate patches associated with the first number of pixels from the initial occluder while maintaining the first quality metric above a first threshold to form the occluder for the visual three-dimensional structure, wherein the first threshold is determined based on a change in a precision when a face from the initial occluder is removed, and the occluder blocks the objects behind the visual three-dimensional structure from being rendered in an application along the first view direction.

2. The method of claim 1, wherein simplifying the input model into an initial occluder including a plurality of candidate patches in a patch-based coarse mesh comprises merging a first number of faces in the plurality of faces into the plurality of candidate patches, the plurality of candidate patches satisfying a threshold for the first quality metric.

3. The method of claim 2, wherein merging the first number of faces into the plurality of candidate patches comprises combining faces within a first degree of coplanarity into a candidate planar patch in the plurality of candidate patches.

4. The method of claim 1, further comprising:
   voxelizing the input model to obtain a plurality of voxels for generating a voxelization-based coarse mesh; and
   combining the patch-based coarse mesh and the voxelization-based coarse mesh to form the initial occluder.

5. The method of claim 4, wherein the generating a voxelization-based coarse mesh includes:
   voxelizing a bounding box of the input model to obtain the plurality of voxels;
   computing a winding number for each of the plurality of voxels;
   extracting an isosurface based on the winding number; and
   simplifying the isosurface to obtain the voxelization-based coarse mesh.

6. The method of claim 1, wherein the removing one or more candidate patches from the initial occluder comprises:
   discretizing space around and within the input model into a plurality of equally sized blocks, each of the equally sized blocks having a plurality of view directions;
   merging a portion of the plurality of equally sized blocks into a plurality of larger blocks; and
   removing a view direction from a respective one of the plurality of larger blocks for which the input model is outside a view frustrum of the view direction.

7. The method of claim 1, further comprising hole-filling the patch-based coarse mesh.

8. The method of claim 1, wherein a number of faces in the occluder is less than 10% of a number of faces in the input model.

9. The method of claim 1, wherein the first quality metric of the initial occluder is determined by identifying one or more pixels that are within a first two-dimensional area occluded by the input model of the visual three-dimensional structure and a second two-dimensional area occluded by the initial occluder along the first view direction.

10. A computing system comprising:
    one or more processors;
    memory; and
    a plurality of programs stored in the memory, wherein the plurality of programs, when executed by the one or more processors, cause the computing system to perform a method for automatically generating an occluder for a visual three-dimensional structure, the method including:
    receiving an input model of the visual three-dimensional structure, the input model comprising a plurality of faces;
    simplifying the input model into an initial occluder including a plurality of candidate patches in a patch-based coarse mesh;
    determining a first quality metric of the initial occluder associated with a precision, wherein the precision is measured by a first number of pixels corresponding to objects behind the visual three-dimensional structure that are blocked by the input model and the initial occluder along a first view direction; and
    removing one or more candidate patches associated with the first number of pixels from the initial occluder while maintaining the first quality metric above a first threshold to form the occluder for the visual three-dimensional structure, wherein the first threshold is determined based on a change in a precision when a face from the initial occluder is removed, and the occluder blocks the objects behind the visual three-dimensional structure from being rendered in an application along the first view direction.

11. The computing system of claim 10, wherein simplifying the input model into an initial occluder including a plurality of candidate patches in a patch-based coarse mesh comprises merging a first number of faces in the plurality of faces into the plurality of candidate patches, the plurality of candidate patches satisfying a threshold for the first quality metric.

12. The computing system of claim 11, wherein merging the first number of faces into the plurality of candidate patches comprises combining faces within a first degree of coplanarity into a candidate planar patch in the plurality of candidate patches.

13. The computing system of claim 10, wherein the method further comprises:
    voxelizing the input model to obtain a plurality of voxels for generating a voxelization-based coarse mesh; and
    combining the patch-based coarse mesh and the voxelization-based coarse mesh to form the initial occluder.

14. The computing system of claim 13, wherein the generating a voxelization-based coarse mesh includes:
    voxelizing a bounding box of the input model to obtain the plurality of voxels;
    computing a winding number for each of the plurality of voxels;
    extracting an isosurface based on the winding number; and simplifying the isosurface to obtain the voxelization-based coarse mesh.

15. The computing system of claim 10, wherein the removing one or more candidate patches from the initial occluder comprises:
   discretizing space around and within the input model into a plurality of equally sized blocks, each of the equally sized blocks having a plurality of view directions;
   merging a portion of the plurality of equally sized blocks into a plurality of larger blocks; and
   removing a view direction from a respective one of the plurality of larger blocks for which the input model is outside a view frustrum of the view direction.

16. The computing system of claim 10, wherein the method further comprises hole-filling the patch-based coarse mesh.

17. The computing system of claim 10, wherein a number of faces in the occluder is less than 10% of a number of faces in the input model.

18. The computing system of claim 10, wherein the first quality metric of the initial occluder is determined by identifying one or more pixels that are within a first two-dimensional area occluded by the input model of the visual three-dimensional structure and a second two-dimensional area occluded by the initial occluder along the first view direction.

19. A non-transitory computer readable storage medium storing a plurality of programs, wherein the plurality of programs, when executed by one or more processors of a computer system, cause the computing system to perform a method for automatically generating an occluder for a visual three-dimensional structure, the method including:
   receiving an input model of the visual three-dimensional structure, the input model comprising a plurality of faces;
   simplifying the input model into an initial occluder including a plurality of candidate patches in a patch-based coarse mesh;
   determining a first quality metric of the initial occluder associated with a precision, wherein the precision is measured by a first number of pixels corresponding to objects behind the visual three-dimensional structure that are blocked by the input model and the initial occluder along a first view direction; and
   removing one or more candidate patches associated with the first number of pixels from the initial occluder while maintaining the first quality metric above a first threshold to form the occluder for the visual three-dimensional structure, wherein the first threshold is determined based on a change in a precision when a face from the initial occluder is removed, and the occluder blocks the objects behind the visual three-dimensional structure from being rendered in an application along the first view direction.

20. The non-transitory computer readable storage medium of claim 19, wherein the first quality metric of the initial occluder is determined by identifying one or more pixels that are within a first two-dimensional area occluded by the input model of the visual three-dimensional structure and a second two-dimensional area occluded by the initial occluder along the first view direction.

* * * * *